United States Patent
Nishio et al.

(10) Patent No.: US 7,561,894 B2
(45) Date of Patent: Jul. 14, 2009

(54) TRANSMISSION POWER CONTROL METHOD AND BASE STATION DEVICE

(75) Inventors: Akihiko Nishio, Yokosuka (JP); Makis Kasapidis, Yokohama (JP); Katsuhiko Hiramatsu, Yokosuka (JP); Isamu Yoshii, Urayasu (JP); Toshiyuki Uehara, Yokohama (JP); Katsuyoshi Naka, Yokosuka (JP)

(73) Assignee: Panasonic Corporation, Osaka (JP)

( * ) Notice: Subject to any disclaimer, the term of this patent is extended or adjusted under 35 U.S.C. 154(b) by 334 days.

(21) Appl. No.: 10/528,120

(22) PCT Filed: Sep. 18, 2003

(86) PCT No.: PCT/JP03/11868

§ 371 (c)(1),
(2), (4) Date: Mar. 16, 2005

(87) PCT Pub. No.: WO2004/028039

PCT Pub. Date: Apr. 1, 2004

(65) Prior Publication Data

US 2006/0166690 A1    Jul. 27, 2006

(30) Foreign Application Priority Data

Sep. 19, 2002   (JP)   .............................. 2002-273164

(51) Int. Cl.
*H04B 7/00* (2006.01)
*H04Q 7/20* (2006.01)

(52) U.S. Cl. .................... 455/522; 455/69; 455/517; 455/452.1

(58) Field of Classification Search ................. 455/13.4, 455/69, 517, 522, 515, 450, 509, 452.1, 67.11
See application file for complete search history.

(56) References Cited

U.S. PATENT DOCUMENTS

| | | | | |
|---|---|---|---|---|
| 5,574,983 A | * | 11/1996 | Douzono et al. | 455/69 |
| 5,933,782 A | * | 8/1999 | Nakano et al. | 455/522 |
| 6,064,659 A | * | 5/2000 | Rohani et al. | 370/318 |

(Continued)

FOREIGN PATENT DOCUMENTS

JP    20017759    1/2001

(Continued)

OTHER PUBLICATIONS

PCT International Search Report dated Jan. 20, 2004.

(Continued)

*Primary Examiner*—John J Lee
(74) *Attorney, Agent, or Firm*—Dickinson Wright, PLLC

(57) ABSTRACT

In order to appropriately control transmit power of a common channel for an MBMS (Multimedia Broadcast/Multicast Service) so as not to become excessive, a mobile station 1 transmits a TPC command for an S-CCPCH to a base station through an uplink DPCH1 and a mobile station 2 transmits a TPC command for an S-CCPCH to the base station through an uplink DPCH2. When either one of the TPC command for the S-CCPCH transmitted from the mobile station 1 and the TPC command for the S-CCPCH transmitted from the mobile station 2 is a TPC command instructing "Up", the base station increases transmit power of the downlink S-CCPCH and decreases transmit power of the downlink S-CCPCH when both TPC commands instruct "Down".

10 Claims, 15 Drawing Sheets

U.S. PATENT DOCUMENTS

| | | | |
|---|---|---|---|
| 6,173,162 B1 * | 1/2001 | Dahlman et al. | 455/69 |
| 6,389,265 B1 * | 5/2002 | Jeschke et al. | 455/69 |
| 6,397,043 B1 * | 5/2002 | Kang | 455/69 |
| 6,434,367 B1 * | 8/2002 | Kumar et al. | 455/522 |
| 6,667,965 B1 * | 12/2003 | Yamaura et al. | 370/347 |
| 6,728,226 B1 * | 4/2004 | Naito | 370/328 |
| 6,801,785 B2 * | 10/2004 | Motoyoshi | 455/522 |
| 6,909,881 B2 * | 6/2005 | Uehara et al. | 455/69 |
| 2001/0012276 A1 * | 8/2001 | Tsunehara et al. | 370/318 |
| 2001/0027112 A1 * | 10/2001 | Voyer | 455/522 |
| 2001/0046877 A1 | 11/2001 | Ohkubo et al. | |
| 2002/0013156 A1 * | 1/2002 | Yamamoto et al. | 455/522 |
| 2002/0193133 A1 * | 12/2002 | Shibutani | 455/522 |
| 2003/0199275 A1 * | 10/2003 | Sakoda et al. | 455/446 |
| 2004/0014482 A1 * | 1/2004 | Kwak et al. | 455/522 |
| 2004/0266469 A1 * | 12/2004 | Hayashi et al. | 455/522 |

FOREIGN PATENT DOCUMENTS

| | | |
|---|---|---|
| JP | 2001292097 | 10/2001 |
| JP | 2002198903 | 7/2002 |

OTHER PUBLICATIONS

3GPP TS25.211 V5.1.0 (Jun. 2002), Release 5, pp. 28-30.

3GPP TS22.146 V6.0.0 (Jun. 2002); 3rd Generation Partnership Project; Technical Specification Group Services and System Aspects; Multimedia Broadcast/Multicast Service; Stage 1 (Release 6), pp. 1-15.

* cited by examiner

TRANSMISSION POWER CONTROL METHOD AND BASE STATION DEVICE

TECHNICAL FIELD

The present invention relates to a method for controlling transmit power and base station apparatus.

BACKGROUND ART

In the field of mobile communications, technological studies on a multimedia broadcast/multicast service (hereinafter referred to as "MBMS") are being carried forward recently (e.g., see "3GPP TS 22.146 V6.0.0 (2002-06): 3rd Generation Partnership Project; Technical Specification Group Services and System Aspects; Multimedia Broadcast/Multicast Service; Stage 1 (Release 6) June 2002"). A communication carried out in an MBMS is not a one-to-one (Point to Point: P-to-P) communication but one-to-multi (Point to Muiti: P-to-M) communication. That is, in the MBMS, one base station transmits the same data (e.g., music data and video image data, etc.) to a plurality of mobile stations simultaneously.

The MBMS has a broadcast mode and multicast mode. While the broadcast mode is a mode in which information is transmitted to all mobile stations as with current radio broadcasting, the multicast mode is a mode in which information is transmitted to only specific mobile stations affiliating a news group or other services.

Advantages in carrying out the MBMS include the following: That is, when each mobile station receives information transmitted from a base station through a streaming service, etc., using one channel, if the number of mobile stations requesting the information increases, the load on the radio channel increases. However, when the MBMS is used, even if the number of mobile stations increases, all those mobile stations receive the information using the same channel, and therefore it is possible to increase the number of mobile stations capable of receiving the information without increasing the load on the radio channel. Currently, distribution of traffic information, music distribution, news distribution at a station, distribution of live coverage of a sport event, etc., are considered as services available using the MBMS and providing these services at a transmission rate of approximately 8 to 256 kbps is under study.

In an MBMS, use of an S-CCPCH (Secondary Common Control Physical Channel) which is used in a current W-CDMA mobile communication scheme as a channel to transmit the same data to a plurality of mobile stations simultaneously is under study. The S-CCPCH is a downlink common channel and is used as a paging signal and for data transmission from a higher layer according to the current W-CDMA mobile communication scheme. Furthermore, the S-CCPCH does not perform transmit power control and transmits data with relatively large constant transmit power that can cover the entire cell (e.g., see "3GPP TS 25.211 V5.1.0 (2002-06): 3rd Generation Partnership Project; Technical Specification Group Radio Access Network; Physical channels and mapping of transport channels onto physical channels (FDD) (Release 5) June 2002, 5.3.3.4 Secondary Common Control Physical Channel (S-CCPCH"). This constant transmit power is instructed from a higher layer (control station) to the base station.

Here, as shown in FIG. 1, even if an MBMS is carried out, not only the S-CCPCH for the MBMS but also a DPCH (Dedicated Physical Channel) for carrying out normal speech communication and transmission of dedicated control information, etc., exists as with conventional cases between the base station and mobile station. The DPCH is an uplink/downlink bidirectional dedicated channel and the DPCH is a channel dedicatedly assigned to each mobile station as opposed to the S-CCPCH which is a channel commonly used for all mobile stations within the cell.

As described above, the transmit power of the S-CCPCH is transmit power which is so large and constant that it reaches the cell boundary irrespective of the positions of mobile stations located in the cell. For this reason, for a mobile station located near the base station, its reception quality becomes excessive, which results in waste. Furthermore, interference with other cells also increases causing a reduction of the subscriber capacity (system capacity) of the entire system. Furthermore, an upper limit (maximum transmit power at the base station) of total transmit power of all channels is predetermined for the base station, and therefore if the transmit power of the S-CCPCH is large as shown in FIG. 1, transmit power available for other channels such as the DPCH is relatively reduced and communication quality of a speech communication, etc., deteriorates.

DISCLOSURE OF INVENTION

It is an object of the present invention to provide a method for controlling transmit power and a base station apparatus capable of appropriately controlling transmit power of a common channel for an MBMS so as to prevent the transmit power from becoming excessive.

The present inventor et al. have come up with the present invention by noticing the fact that while an S-CCPCH has only a downlink direction, a DPCH has both directions of uplink and downlink and discovering that it is possible to use an uplink DPCH to transmit a TPC command for the S-CCPCH to a base station. Thus, in order to solve the above described problem and attain the object, the present invention allows each mobile station in an MBMS to transmit both a TPC command for a downlink common channel and a TPC command for a downlink dedicated channel to a base station through an uplink dedicated channel. In this way, it is possible to appropriately control transmit power of a common channel used to transmit MBMS data.

BEST MODE FOR CARRYING OUT THE INVENTION

With reference now to the attached drawings, embodiments of the present invention will be explained in detail below. The following embodiments assume a mobile communication system which carries out an MBMS and will describe a case where an S-CCPCH is used as a downlink common channel to simultaneously transmit the same data to a plurality of mobile stations and DPCHs are used as downlink dedicated channels individually assigned to a plurality of mobile stations as an example.

Embodiment 1

Figure 2:
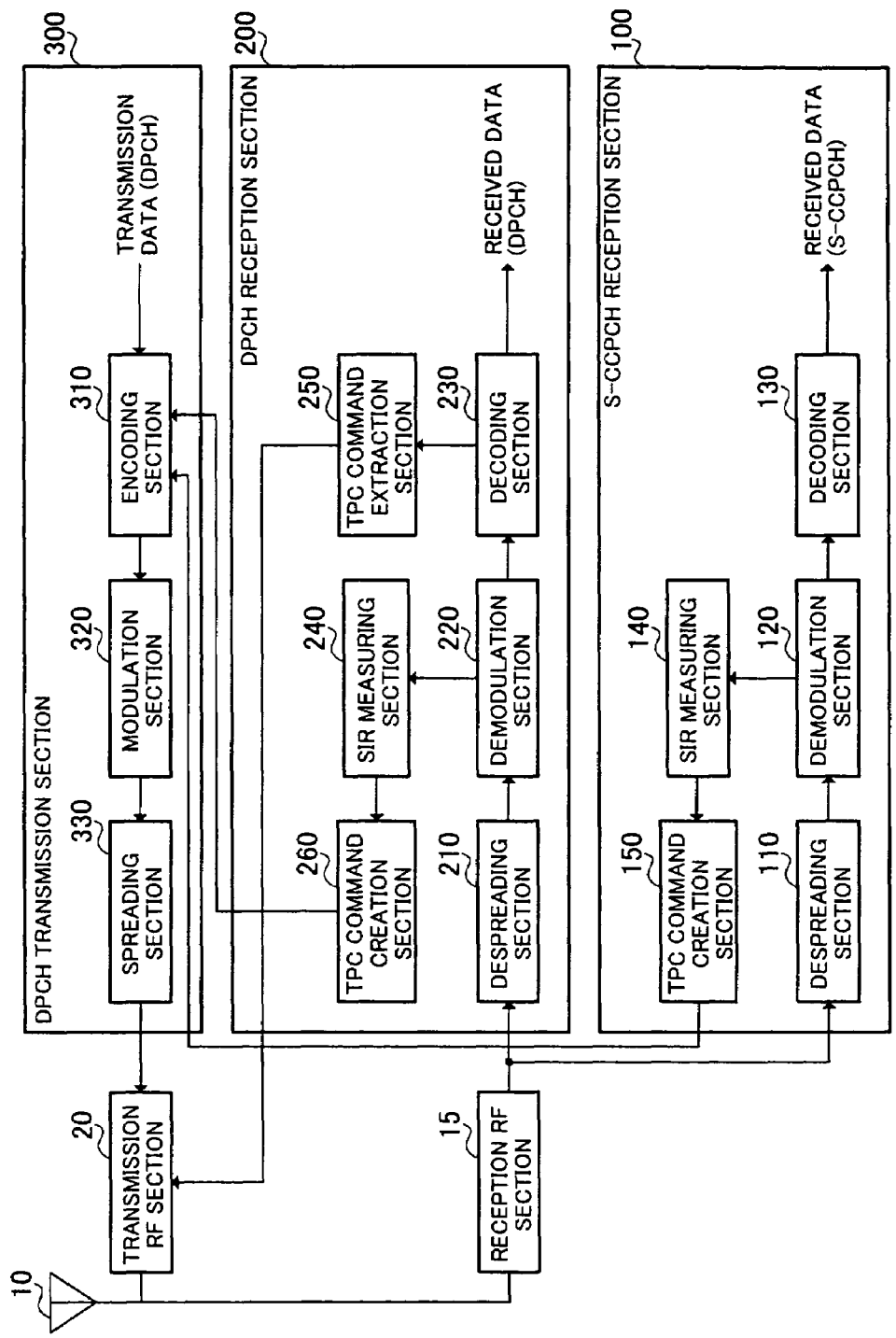
FIG. 2 is a block diagram showing a configuration of a mobile station according to Embodiment 1 of the present invention.

FIG. 2 is a block diagram showing a configuration of a mobile station according to Embodiment 1 of the present invention. This mobile station is used in a mobile communication system in which an MBMS is carried out.

The mobile station shown in FIG. 2 includes an antenna 10, a reception RF section 15, an S-CCPCH reception section 100, a DPCH reception section 200, a DPCH transmission section 300 and a transmission RF section 20. The S-CCPCH reception section 100 includes a despreading section 110, a demodulation section 120, a decoding section 130, an SIR measuring section 140 and a TPC command creation section 150. The DPCH reception section 200 includes a despreading section 210, a demodulation section 220, a decoding section 230, an SIR measuring section 240, a TPC command extraction section 250 and a TPC command creation section 260. The DPCH transmission section 300 includes an encoding section 310, a modulation section 320 and a spreading section 330.

The reception RF section 15 applies down-conversion, AGC (Auto Gain Control) and A/D conversion, etc., to a signal received through the antenna 10. Then, the received signal is input to the despreading section 110 and despreading section 210.

The despreading section 110 of the S-CCPCH reception section 100 applies despreading processing to the received signal using a spreading code assigned to a downlink S-CCPCH. The demodulation section 120 demodulates the despread signal such as QPSK. The demodulated signal is input to the decoding section 130 and SIR measuring section 140. The decoding section 130 carries out a forward error correction and CRC (Cyclic Redundancy Check) on the demodulated received signal of the S-CCPCH and decodes the received signal of the S-CCPCH. In this way, received data (bit string) of the S-CCPCH is obtained. The SIR measuring section 140 measures a reception SIR of the S-CCPCH. The measured SIR is input to the TPC command creation section 150. The TPC command creation section 150 compares the reception SIR of the S-CCPCH with a target SIR for the S-CCPCH and creates a TPC command for the downlink S-CCPCH based on the comparison result. When the measured SIR is equal to or greater than the target SIR, a TPC command for instructing a reduction (Down) of transmit power is created and when the measured SIR is less than the target SIR, a TPC command for instructing an increase (Up) of transmit power is created. The created TPC command for the down link S-CCPCH is input to the encoding section 310.

The despreading section 210 of the DPCH reception section 200 applies despreading processing to the received signal using a spreading code assigned to the downlink DPCH of the own station. The demodulation section 220 demodulates the despread signal such as QPSK. The demodulated signal is input to the decoding section 230 and SIR measuring section 240. The decoding section 230 carries out a forward error correction and CRC on the demodulated received signal of the DPCH and decodes the received signal of the DPCH. In this way, the received data (bit string) of the DPCH is obtained. The received data of the DPCH is input to the TPC command extraction section 250. The TPC command extraction section 250 extracts a TPC command for the uplink DPCH placed in a time slot of the received data of the DPCH. The extracted TPC command for the uplink DPCH is input to the transmission RF section 20. The SIR measuring section 240 measures the reception SIR of the DPCH. The measured SIR is input to the TPC command creation section 260. The TPC command creation section 260 compares the reception SIR of the DPCH with a target SIR for the DPCH and creates a TPC command for the downlink DPCH based on the comparison result. When the measured SIR is equal to or greater than the target SIR, a TPC command instructing "Down" is created and when the measured SIR is less than the target SIR, a TPC command instructing "Up" is created. The created TPC command for the downlink DPCH is input to the encoding section 310.

The encoding section 310 of the DPCH transmission section 300 carries out convolution coding and CRC coding on the transmission data (bit string) of the DPCH to encode the transmission data of the DPCH and constructs a transmission frame composed of a plurality of time slots. At this time, the encoding section 310 arranges the TPC command for the downlink DPCH and TPC command for the downlink S-CCPCH in the time slot. The method for the arrangement will be described later. The modulation section 320 applies modulation processing such as QPSK to the transmission data. The spreading section 330 applies spreading processing to the modulated transmission signal using a spreading code assigned to the uplink DPCH of the own station. The transmission signal after the spreading is input to the transmission RF section 20.

The transmission RF section 20 carries out processing such as D/A conversion, transmit power control and up-conversion, etc., on the transmission signal after the spreading by the spreading section 330 and then transmits the transmission signal from the antenna 10 to the base station through the uplink DPCH. In this case, the transmission RF section 20 controls the transmit power of the uplink DPCH according to the TPC command for the uplink DPCH input from the TPC command extraction section 250.

Figure 3:
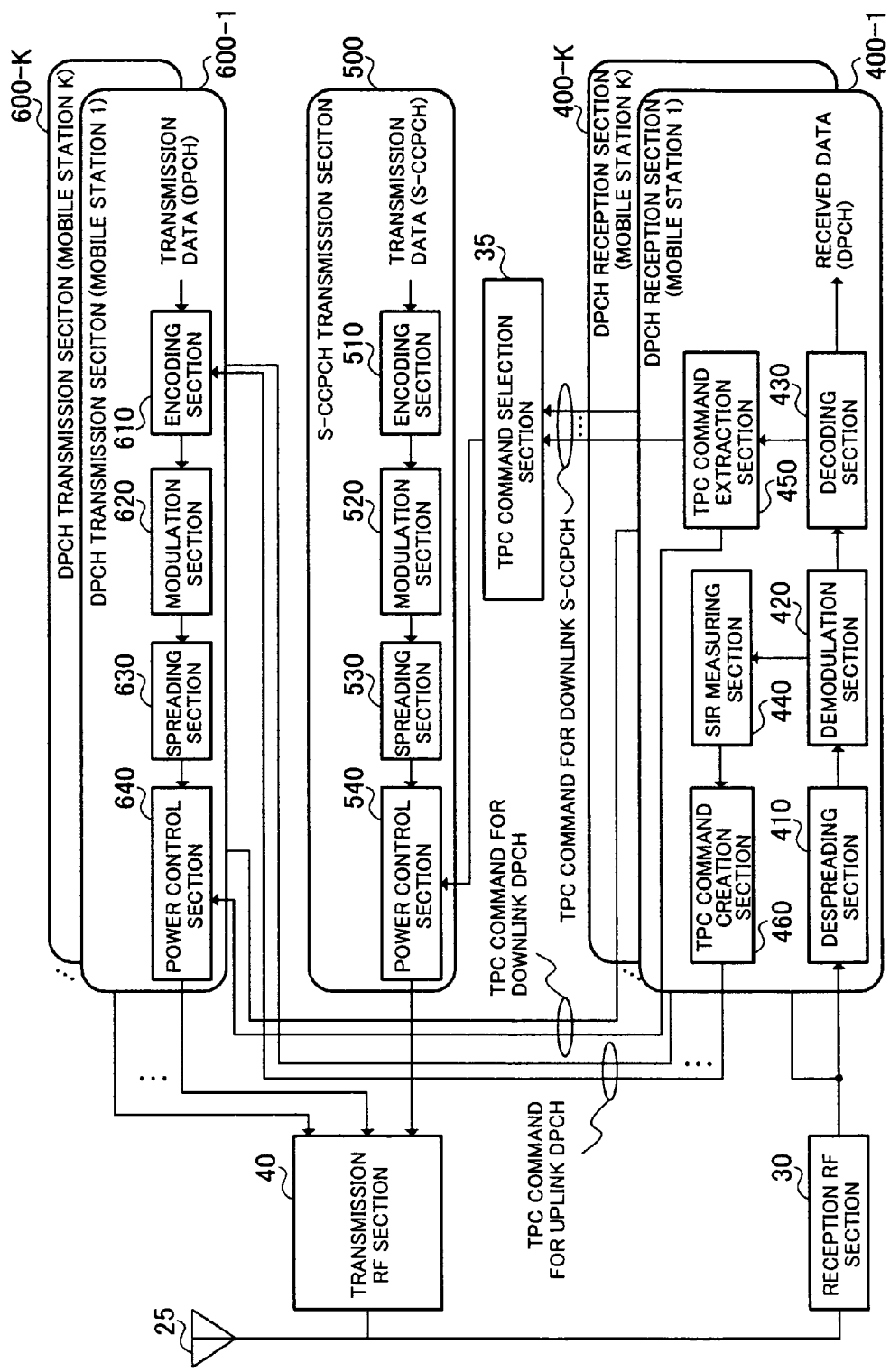
FIG. 3 is a block diagram showing a configuration of a base station according to Embodiment 1 of the present invention.

Then, the configuration of the base station will be explained. FIG. 3 is a block diagram showing a configuration of the base station according to Embodiment 1 of the present invention. This base station is used in a mobile communication system which carries out an MBMS.

The base station shown in FIG. 3 includes an antenna 25, a reception RF section 30, DPCH reception sections 400-1 to 400-K, a TPC command selection section 35, an S-CCPCH transmission section 500, DPCH transmission sections 600-1 to 600-K and a transmission RF section 40. Furthermore, there are K DPCH reception sections 400-1 to 400-K, where K is the maximum number of mobile stations with which the base station can communicate, and each DPCH reception section includes a despreading section 410, a demodulation section 420, a decoding section 430, an SIR measuring section 440, a TPC command extraction section 450 and a TPC command creation section 460. The DPCH reception section 400-1 is for the mobile station 1 and the DPCH reception section 400-K is for the mobile station K. The S-CCPCH transmission section 500 includes an encoding section 510, a modulation section 520, a spreading section 530 and a power control section 540. Furthermore, there are K DPCH transmission sections 600-1 to 600-K, where K is the maximum number of mobile stations with which the base station can communicate and each DPCH transmission section includes an encoding section 610, a modulation section 620, a spreading section 630 and a power control section 640. The DPCH transmission section 600-1 is for the mobile station 1 and the DPCH transmission section 600-K is for the mobile station K.

The reception RF section 30 applies down-conversion, AGC and A/D conversion, etc., to the signal received through the antenna 25. Then, the received signal is input to the respective despreading sections 410 of the DPCH reception sections 400-1 to 400-K.

The DPCH reception sections 400-1 to 400-K perform the same operations, and therefore only the DPCH reception section 400-1 will be explained below. The despreading section 410 of the DPCH reception section 400-1 applies despreading processing to the received signal using the spreading code assigned to the uplink DPCH of the mobile station 1. The demodulation section 420 demodulates the despread signal such as QPSK. The demodulated signal is input to the decoding section 430 and Sir measuring section 440. The decoding section 430 carries out a forward error correction and CRC on the demodulated received signal of the DPCH and decodes the received signal of the DPCH. In this way, the received data (bit string) of the DPCH is obtained. The received data of the DPCH is input to the TPC command extraction section 450. The TPC command extraction section 450 extracts the TPC command for the downlink S-CCPCH and the TPC command for the downlink DPCH placed in the time slot of the received data of the DPCH. The extracted TPC command for the downlink S-CCPCH is input to the TPC command selection section 35. That is, the TPC command selection section 35 receives the TPC commands for the downlink S-CCPCH from the respective TPC command extraction sections 450 of the DPCH reception sections 400-1 to 400-K. Furthermore, the extracted TPC command for the downlink DPCH is input to the power control section 640 of the DPCH transmission section 600-1. The SIR measuring section 440 measures the reception SIR of the DPCH. The measured SIR is input to the TPC command creation section 460. The TPC command creation section 460 compares the reception SIR of the DPCH with a target SIR for the DPCH and creates a TPC command for the uplink DPCH based on the comparison result. When the measured SIR is equal to or greater than the target SIR, a TPC command instructing "Down" is created and when the measured SIR is less than the target SIR, a TPC command instructing "Up" is created. The created TPC command for the uplink DPCH is input to the encoding section 610 of the DPCH transmission section 600-1.

The TPC command selection section 35 compares a plurality of TPC commands for the downlink S-CCPCH input from the DPCH reception sections 400-1 to 400-K. Then, if there is at least one TPC command instructing "Up" among those TPC commands, the TPC command instructing "Up" is selected and input to the power control section 540. On the other hand, if all the TPC commands instruct "Down", the TPC command instructing "Down" is selected and input to the power control section 540.

The encoding section 510 of the S-CCPCH transmission section 500 carries out convolution coding and CRC coding on the transmission data (bit string) of the S-CCPCH, encodes the transmission data of the S-CCPCH and constructs a transmission frame composed of a plurality of time slots. The modulation section 520 applies modulation processing such as QPSK to the transmission data. The spreading section 530 applies spreading processing to the modulated transmission signal using the spreading code assigned to the downlink S-CCPCH. The transmit power of the transmission signal after the spreading is controlled by the power control section 540 according to the TPC command selected by the TPC command selection section 35. Therefore, if there is at least one TPC command instructing "Up" among a plurality of K TPC commands for the downlink S-CCPCH transmitted from the plurality of mobile stations 1 to K, the transmit power of the downlink S-CCPCH is increased and if all the K TPC commands are TPC commands instructing "Down", the transmit power of the downlink S-CCPCH is decreased. That is, the transmit power of the downlink S-CCPCH is the same for all mobile stations. The downlink S-CCPCH signal after transmit power control is input to the transmission RF section 40.

The operations of the DPCH transmission sections 600-1 to 600-K are the same, and therefore only the DPCH transmission section 600-1 will be explained. The encoding section 610 of the DPCH transmission section 600-1 carries out convolution coding and CRC coding on the transmission data (bit string) of the DPCH directed to the mobile station 1, encodes the transmission data of the DPCH and constructs a transmission frame composed of a plurality of time slots. The modulation section 620 applies modulation processing such as QPSK to the transmission data. The spreading section 630 applies spreading processing to the modulated transmission signal using the spreading code assigned to the downlink DPCH of the mobile station 1. The transmit power of the spread transmission signal is controlled by the power control section 640 according to the TPC command for the downlink DPCH extracted by the TPC command extraction section 450. Therefore, the transmit power of the downlink DPCH is individually controlled for each mobile station. The downlink DPCH signal after the transmit power control is input to the transmission RF section 40.

The transmission RF section 40 carries out processing such as D/A conversion and up-conversion on the S-CCPCH transmission signal after the transmit power control and the DPCH transmission signal after the transmit power control, and then transmits the respective transmission signals from the antenna 25 to the mobile stations 1 to K through the downlink S-CCPCH and downlink DPCH's.

Figure 4:
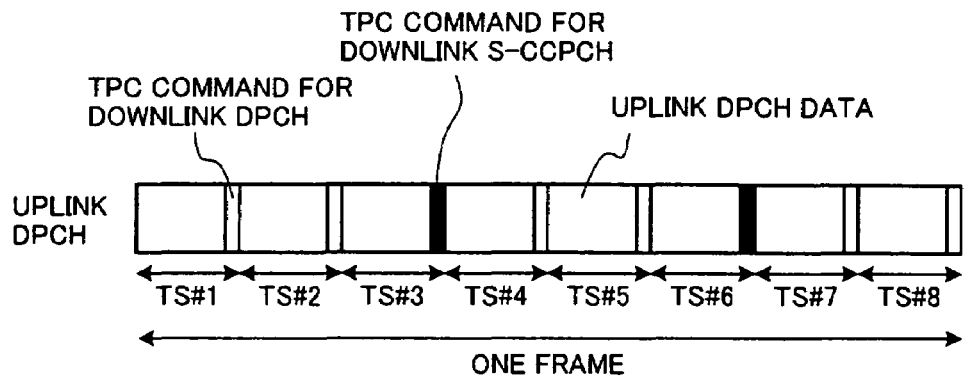
FIG. 4 illustrates transmission timings of TPC commands according to Embodiment 1 of the present invention.
Figure 5:
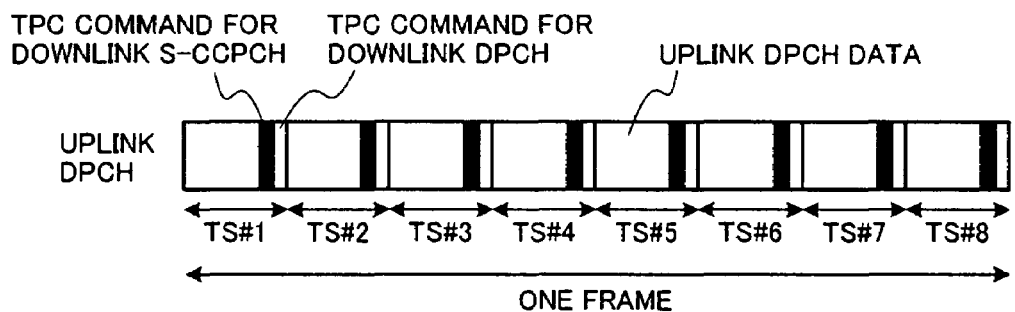
FIG. 5 illustrates transmission timings of TPC commands according to Embodiment 1 of the present invention.
Figure 6:
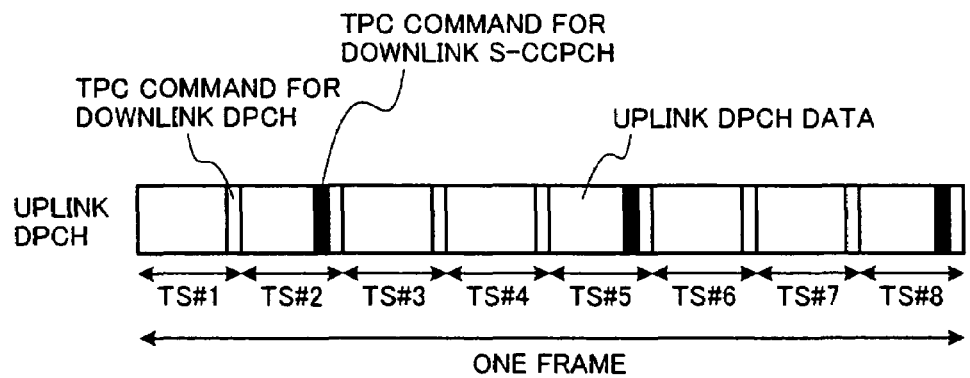
FIG. 6 illustrates transmission timings of TPC commands according to Embodiment 1 of the present invention.

Then, the method of arranging TPC commands at the mobile station will be explained using FIG. 4 to FIG. 6. In FIG. 4 to FIG. 6, an example where one frame consists of 8 time slots (TS#1 to TS#8) is shown for convenience of explanation, but one frame actually consists of 15 time slots.

As shown in FIG. 4, the mobile station arranges TPC commands for the downlink S-CCPCH instead of TPC commands for the downlink DPCH at a rate of once for every several time slots. For example, the mobile station arranges a TPC command for the downlink S-CCPCH once, while it arranges a TPC command for the downlink DPCH twice. That is, the transmission interval of TPC commands for the downlink S-CCPCH is designed to be longer than the transmission interval of TPC commands for the downlink DPCH. Furthermore, in the example shown in FIG. 4, the number of times TPC commands for the downlink S-CCPCH are transmitted is smaller than the number of times TPC commands for the downlink DPCH are transmitted in one frame. Furthermore, in the example in FIG. 4, the TPC commands for the downlink S-CCPCH are arranged in the time slots different from those in which the TPC commands for the downlink DPCH are arranged.

Furthermore, as shown in FIG. 5, a TPC command for the downlink S-CCPCH is arranged in parallel to a TPC command for the downlink DPCH within one time slot. That is, both the TPC command for the downlink DPCH and TPC command for the downlink S-CCPCH are transmitted in the same time slot. Furthermore, both TPC commands for the downlink DPCH and TPC commands for the downlink S-CCPCH are arranged in all time slots. Therefore, in this example, the transmission interval of TPC commands for the downlink S-CCPCH and the transmission interval of TPC commands for the downlink DPCH are the same. Furthermore, the number of times TPC commands for the downlink S-CCPCH are transmitted is the same as the number of times TPC commands for the downlink DPCH are transmitted in one frame.

Furthermore, as shown in FIG. 6, time slots including both TPC command for the downlink DPCH and TPC command for the downlink S-CCPCH and time slots including only a TPC command for the downlink DPCH are provided in one frame. In this example, the transmission interval of TPC commands for the downlink S-CCPCH is also longer than the transmission interval of TPC commands for the downlink DPCH. Furthermore, within one frame, the number of times TPC commands for the downlink S-CCPCH are transmitted is smaller than the number of times TPC commands for the downlink DPCH are transmitted.

The mobile station transmits both the TPC commands for the downlink DPCH and TPC commands for the downlink S-CCPCH arranged in this way to the base station through the uplink DPCH.

Figure 7:
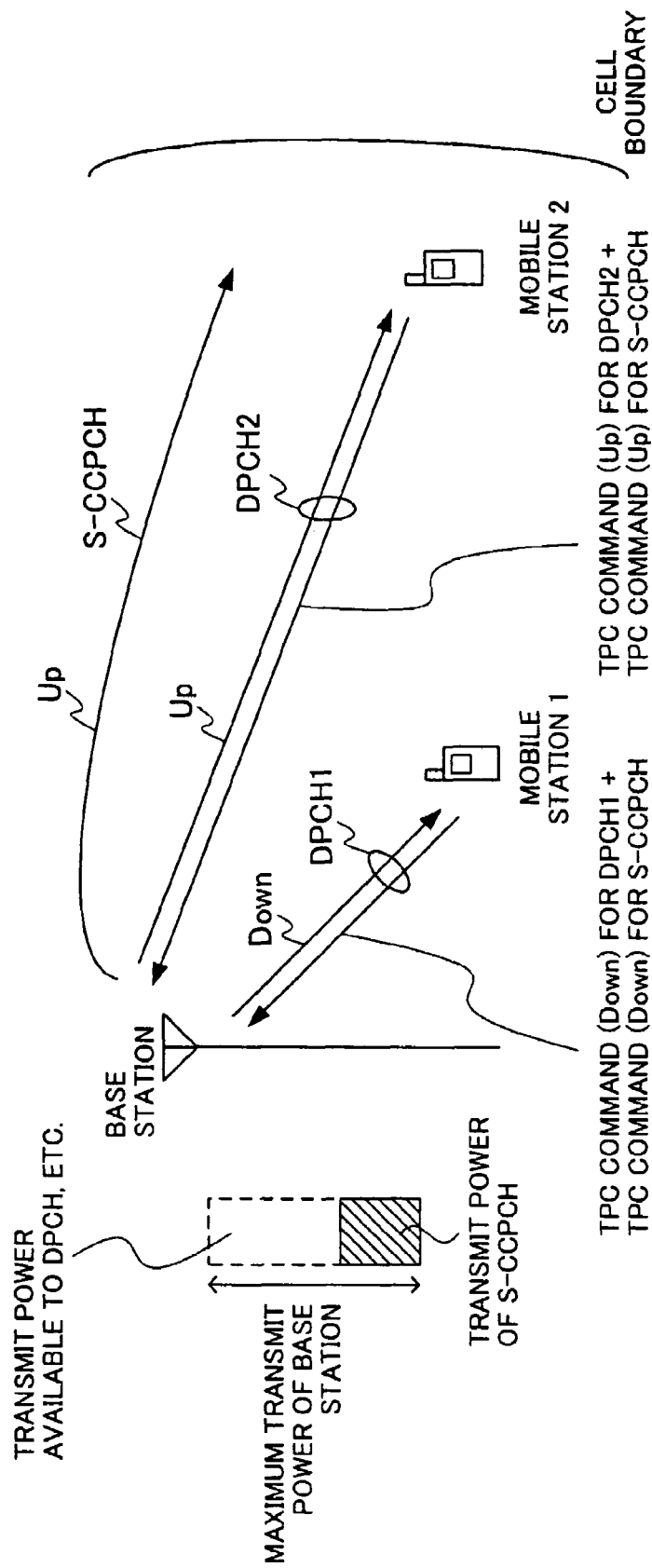
FIG. 7 illustrates transmit power control according to Embodiment 1 of the present invention.

Then, the transmit power control according to this embodiment will be explained using FIG. 7. In FIG. 7, DPCH1 denotes a DPCH assigned to the mobile station 1 and DPCH2 denotes a DPCH assigned to the mobile station 2.

Now, for example, the mobile station 1 transmits a TPC command for the DPCH1 instructing "Down" of the downlink DPCH1 and a TPC command for the S-CCPCH instructing "Down" of the downlink S-CCPCH to the base station through the uplink DPCH1. Furthermore, the mobile station 2 transmits a TPC command for the DPCH2 instructing "Up" of the downlink DPCH2 and a TPC command for the S-CCPCH instructing "Up" of the downlink S-CCPCH to the base station through the uplink DPCH2.

The base station receives a signal including both TPC command for the DPCH1 and TPC command for the S-CCPCH from the mobile station 1 through the uplink DPCH1. Furthermore, the base station receives a signal including both the TPC command for the DPCH2 and TPC command for the S-CCPCH from the mobile station 2 through the uplink DPCH2. Then, the base station controls the transmit power of the downlink DPCH1 according to the TPC command for the DPCH1 transmitted from the mobile station 1. That is, the base station decreases the transmit power of the downlink DPCH1. Furthermore, the base station controls the transmit power of the downlink DPCH2 according to the TPC command for the DPCH2 transmitted from the mobile station 2. That is the base station increases the transmit power of the downlink DPCH2.

On the other hand, with regard to the downlink S-CCPCH, when either one of the TPC command for the S-CCPCH transmitted from the mobile station 1 or the TPC command for the S-CCPCH transmitted from the mobile station 2 is a TPC command instructing "Up", the base station increases the transmit power of the downlink S-CCPCH. Furthermore, when both the TPC command for the S-CCPCH transmitted from the mobile station 1 and the TPC command for the S-CCPCH transmitted from the mobile station 2 are TPC commands instructing "Down", the base station decreases the transmit power of the downlink S-CCPCH. Therefore, in the example shown in FIG. 7, the base station increases the transmit power of the downlink S-CCPCH. Through such transmit power control over the S-CCPCH, the transmit power of the S-CCPCH is controlled in such a way that the reception SIR of the S-CCPCH is kept at a target SIR at the mobile station located farthest from the base station in the cell. That is, it is possible to control the transmit power of the S-CCPCH to minimum necessary transmit power and consequently make the transmit power of the S-CCPCH smaller than the conventional transmit power.

Figure 1:
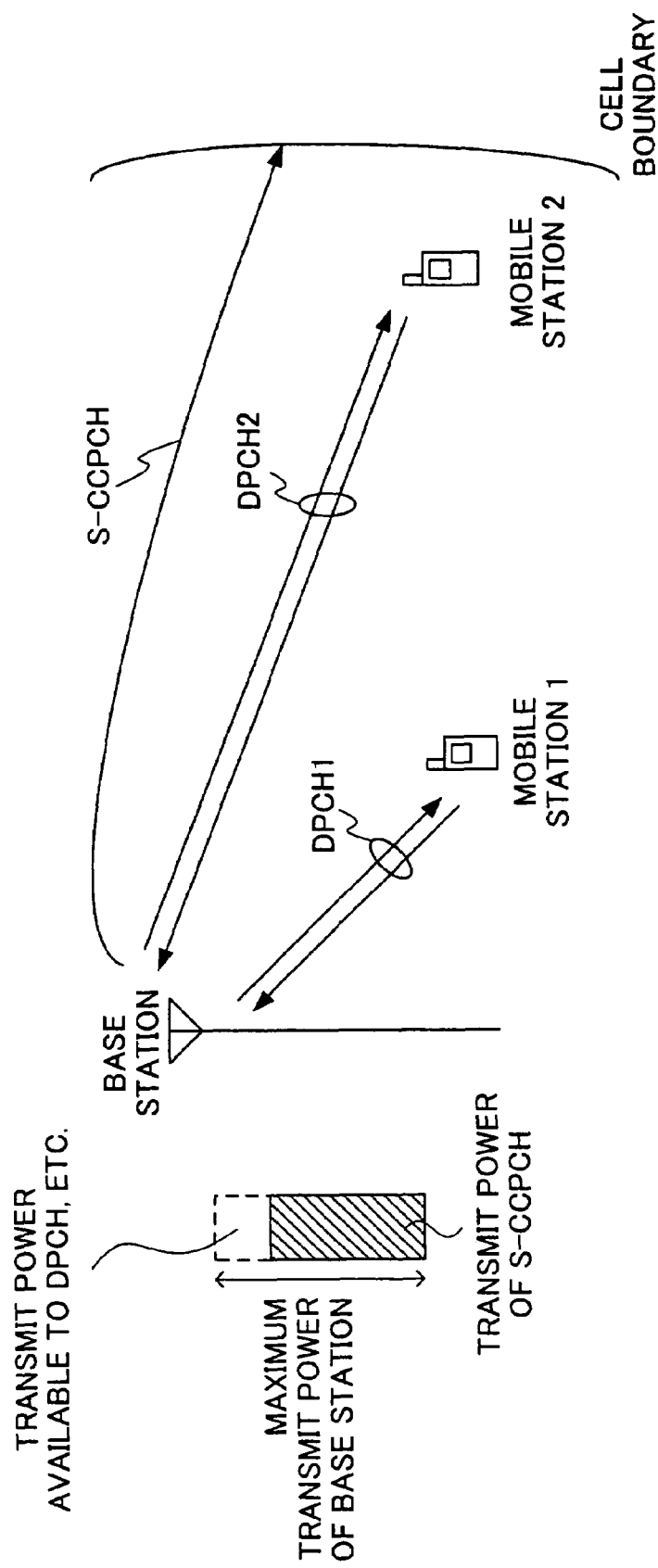
FIG. 1 illustrates conventional transmit power control.

By carrying out transmit power control over the downlink DPCH concurrently with transmit power control over the downlink S-CCPCH, it is possible to comparatively increase transmit power available to other channels such as DPCH as compared to the prior art (FIG. 1) and increase the other channel capacity such as DPCH. Furthermore, it is possible to reduce interference with other cells and consequently prevent the system capacity from reducing.

Embodiment 2

This embodiment controls transmit power of a downlink S-CCPCH to power equal to transmit power of a downlink DPCH under transmit power control according to a TPC command or power with an addition of an offset.

Figure 8:
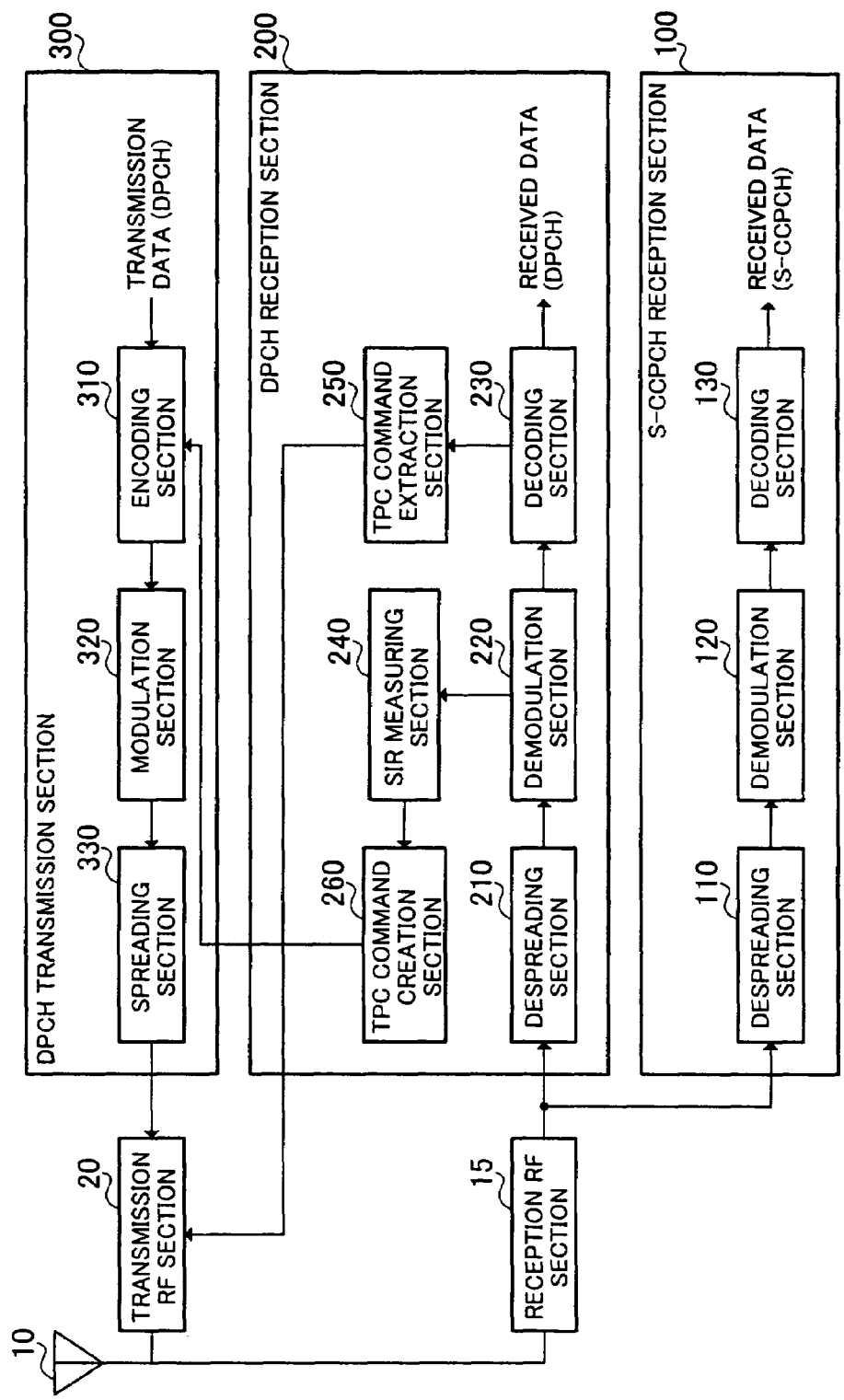
FIG. 8 is a block diagram showing a configuration of a mobile station according to Embodiment 2 of the present invention.

FIG. 8 is a block diagram showing a configuration of a mobile station according to Embodiment 2 of the present invention. The same components as those of Embodiment 1 (FIG. 2) are assigned the same reference numerals and explanations thereof will be omitted. The mobile station shown in FIG. 8 adopts a configuration with the SIR measuring section 140 and TPC command creation section 150 omitted from the S-CCPCH reception section 100 of the mobile station shown in FIG. 2. That is, in the mobile station shown in FIG. 8, no TPC command for the downlink S-CCPCH is created and only TPC commands for the downlink DPCH are input from a TPC command creation section 260 of a DPCH reception section 200 to an encoding section 310. Therefore, TPC commands for the downlink DPCH are transmitted to a base station, but no TPC command for the downlink S-CCPCH is transmitted.

Figure 9:
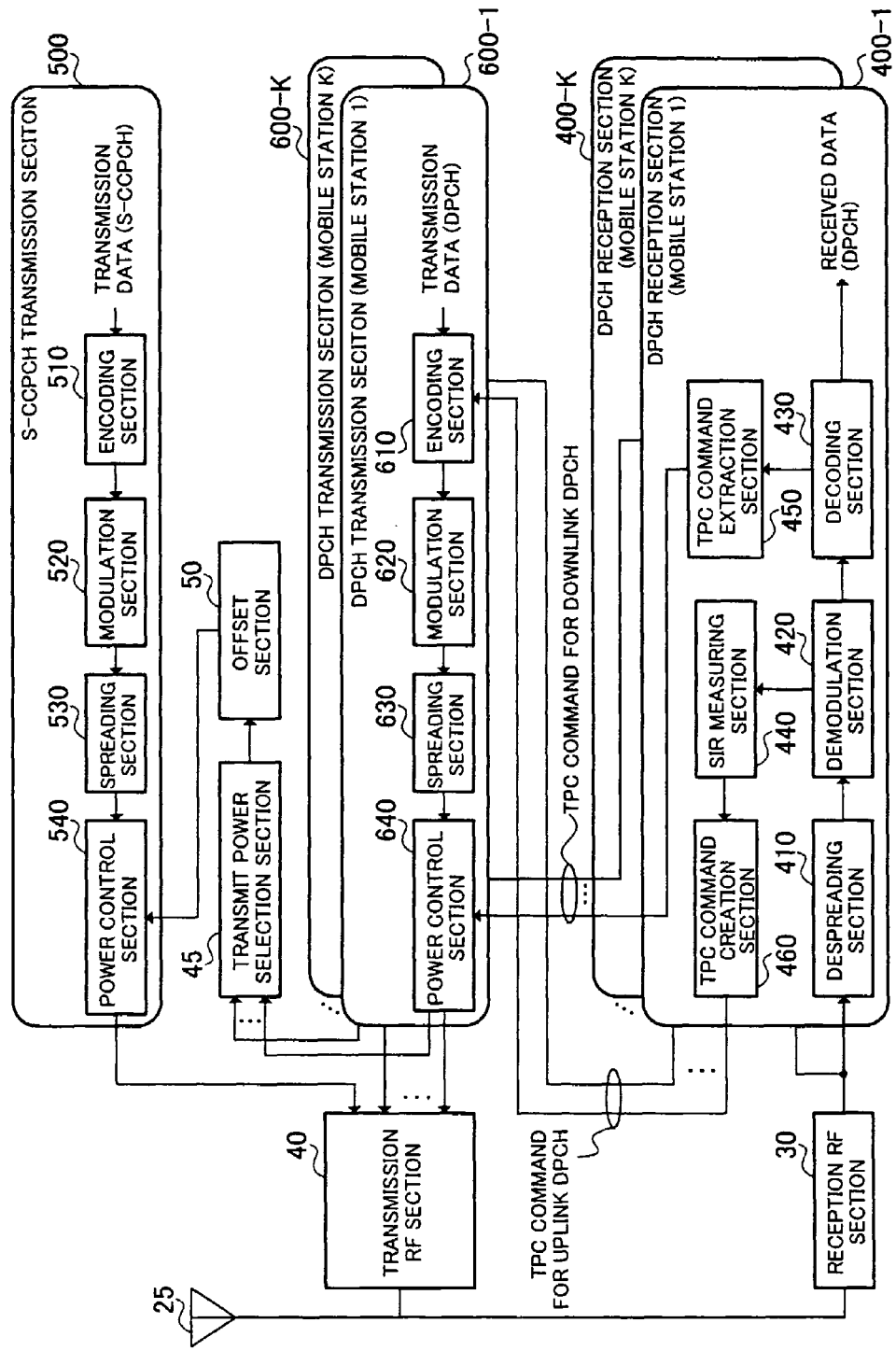
FIG. 9 is a block diagram showing a configuration of a base station according to Embodiment 2 of the present invention.

FIG. 9 is a block diagram showing a configuration of a base station according to Embodiment 2 of the present invention. The base station shown in FIG. 9 adopts a configuration with the TPC command selection section 35 omitted and a transmit power selection section 45 and an offset section 50 added to Embodiment 1 (FIG. 3). The same components as those in Embodiment 1 (FIG. 3) are assigned the same reference numerals and explanations thereof will be omitted.

In a DPCH reception section 400-1 of the base station shown in FIG. 9, a TPC command extraction section 450 extracts TPC commands for the downlink DPCH arranged in time slots of the DPCH received data. The extracted TPC commands for the downlink DPCH are input to a power control section 640 of a DPCH transmission section 600-1. The transmit power of a transmission signal spread by a spreading section 630 is controlled by the power control section 640 according to the TPC command for the downlink DPCH extracted by the TPC command extraction section 450. Therefore, the transmit power of the downlink DPCH is controlled individually for each mobile station as in the case of Embodiment 1. The downlink DPCH signal after the transmit power control is input to a transmission RF section 40. The power control section 640 inputs the transmit power value of the downlink DPCH after the transmit power control to the transmit power selection section 45. That is, transmit power values of the downlink DPCH are input from the respective power control sections 640 of the DPCH transmission sections 600-1 to 600-K to the transmit power selection section 45.

The transmit power selection section 45 selects the largest transmit power value from the plurality of input transmit power values and inputs the selected value to the offset section 50. The offset section 50 inputs the transmit power value input from the transmit power selection section 45 with an addition of an offset to a power control section 540 of an S-CCPCH transmission section 500. The power control section 540 controls the transmit power of the downlink S-CCPCH to a transmit power value that includes this offset. That is, the transmit power value of the downlink S-CCPCH is controlled to a value obtained by adding the offset to the maximum transmit power value of the plurality of transmit power values of the downlink DPCH's after transmit power control.

Note that it is also possible to omit the offset section 50 from the configuration shown in FIG. 9 and directly input the transmit power value selected by the transmit power selection section 45 to the power control section 540 of the S-CCPCH transmission section 500. By so doing, the power control section 540 controls the transmit power value of the downlink S-CCPCH to a value equal to the maximum transmit power value of the plurality of transmit power values of the downlink DPCH's after transmit power control.

Figure 10:
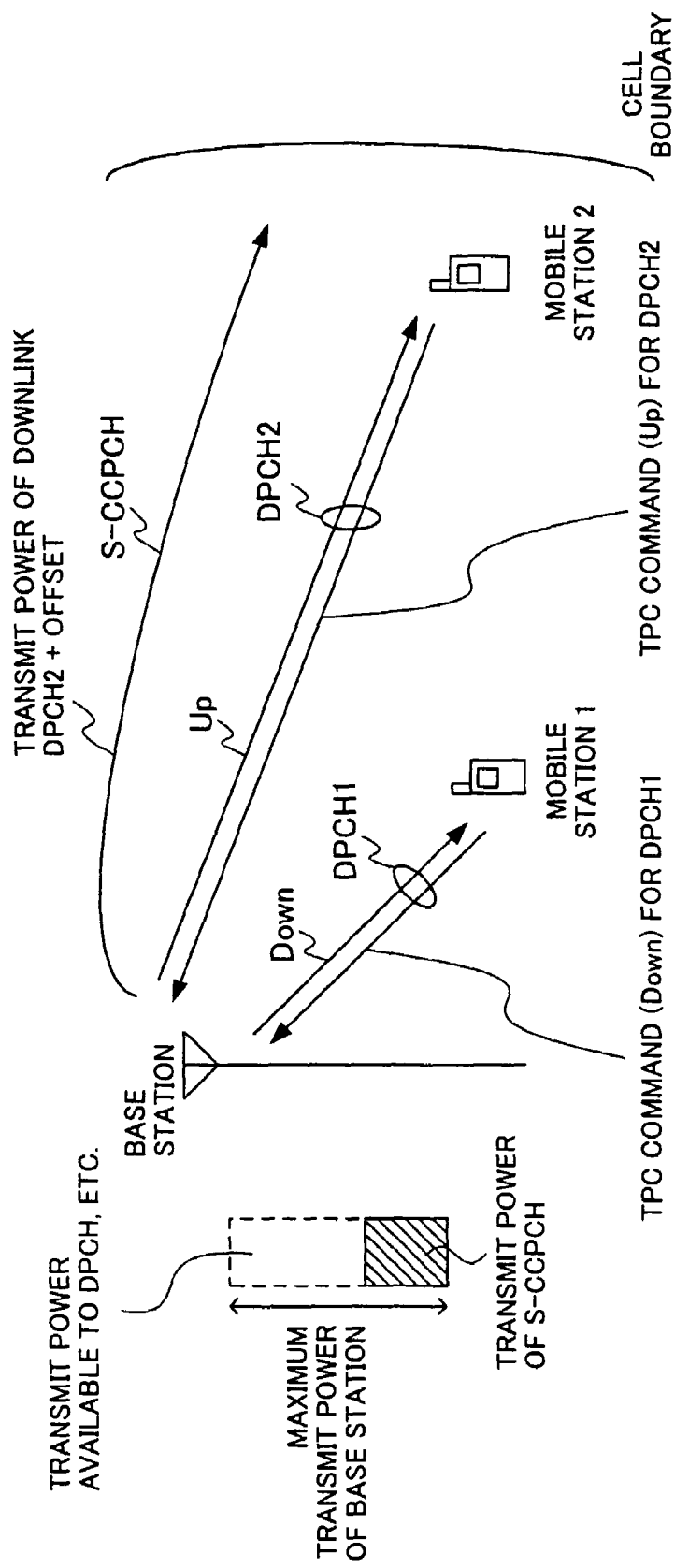
FIG. 10 illustrates transmit power control according to Embodiment 2 of the present invention.

Then, transmit power control according to this embodiment will be explained using FIG. 10. Now, for example, the mobile station 1 transmits a TPC command for the DPCH1 instructing "Down" of the downlink DPCH1 to the base station through the uplink DPCH1 and the mobile station 2 transmits a TPC command for the DPCH2 instructing "Up" of the downlink DPCH2 to the base station through the DPCH2.

The base station receives a signal including a TPC command for the DPCH1 from the mobile station 1 through the uplink DPCH1. The base station further receives a signal including a TPC command for the DPCH2 from the mobile station 2 through the uplink DPCH2. Then, the transmit power of the downlink DPCH1 is controlled according to the TPC command for the DPCH1 transmitted from the mobile station 1. That is, the transmit power of the downlink DPCH1 is decreased. Furthermore, the transmit power of the downlink DPCH2 is controlled according to the TPC command for the DPCH2 transmitted from the mobile station 2. That is, the transmit power of the downlink DPCH2 is increased.

Now, the mobile station 2 is located farther from the base station than the mobile station 1, and therefore the downlink DPCH2 has greater transmit power than the downlink DPCH1. Therefore, the base station controls the transmit power of the downlink S-CCPCH at a value of the transmit power of the downlink DPCH2 with an addition of an offset or at a value equal to the transmit power of the downlink DPCH2. FIG. 10 shows a case where an offset is added.

Thus, by equalizing the transmit power of the S-CCPCH with the transmit power of the downlink DPCH for the mobile station located farthest from the base station in the cell, it is possible to control the transmit power of the S-CCPCH to minimum necessary power for all mobile stations in the cell to receive. As a result, the transmit power of the S-CCPCH can be reduced compared the conventional case. Furthermore, adding an offset can provide a margin for the transmit power of the S-CCPCH.

Thus, as in the case of Embodiment 1, carrying out transmit power control over the downlink DPCH concurrently with transmit power control over the downlink S-CCPCH makes it possible to comparatively increase the transmit power available to other channels such as DPCH as compared to the conventional case (FIG. 1) and increase capacities of other channels such as DPCH. Furthermore, it is possible to reduce interference with other cells and consequently prevent the system capacity from reducing.

Embodiment 3

This embodiment controls the amount of the offset according to Embodiment 2.

Figure 11:
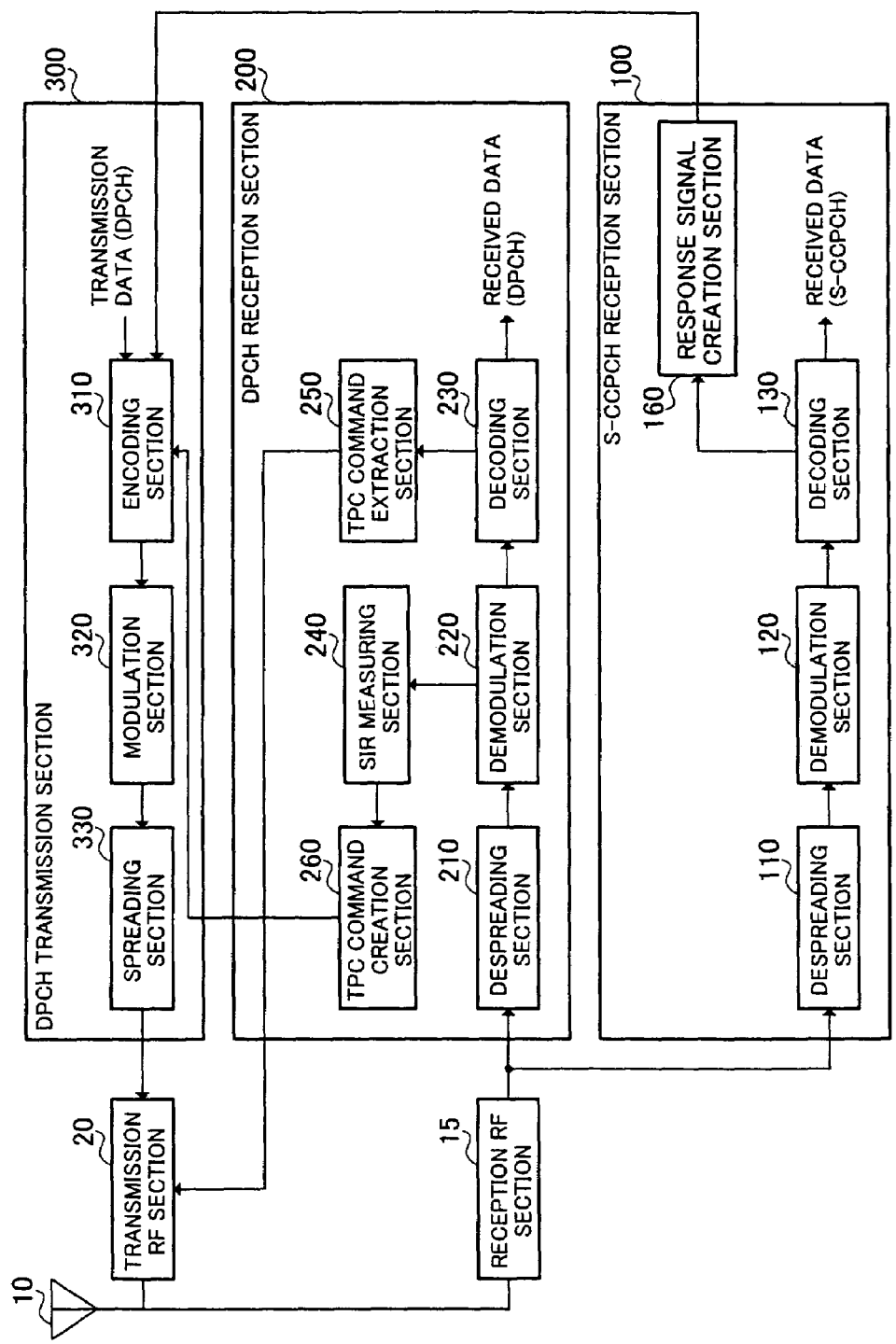
FIG. 11 is a block diagram showing a configuration of a mobile station according to Embodiment 3 of the present invention.

FIG. 11 is a block diagram showing a configuration of a mobile station according to Embodiment 3 of the present invention. The same components as those in Embodiment 2 (FIG. 8) are assigned the same reference numerals and explanations thereof will be omitted. The mobile station shown in FIG. 11 adopts a configuration with a response signal creation section 160 added to the S-CCPCH reception section 100 of the mobile station shown in FIG. 8.

Figure 12:
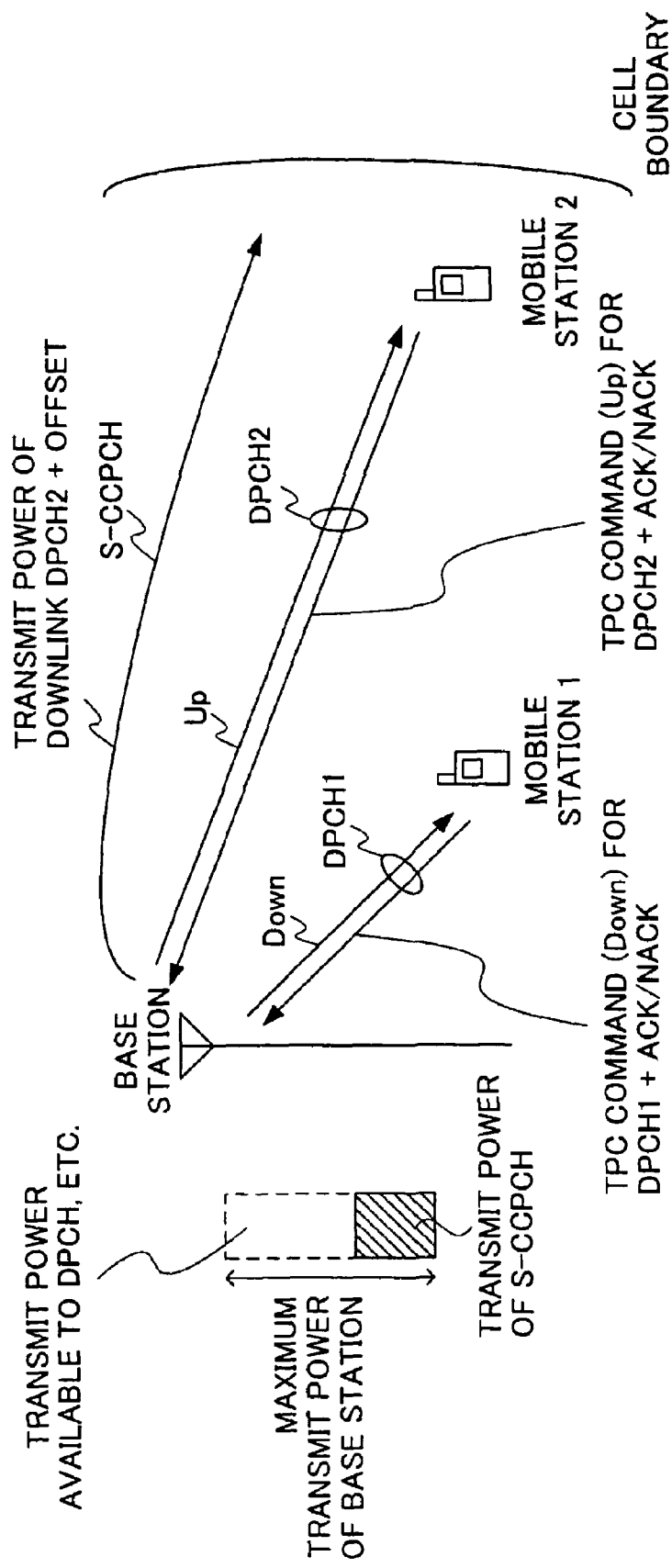
FIG. 12 illustrates transmit power control according to Embodiment 3 of the present invention.

A decoding section 130 of the S-CCPCH reception section 100 inputs a CRC result of the S-CCPCH, that is, CRC=OK (no error) or CRC=NG (error found) to the response signal creation section 160. When CRC=OK is input, the response signal creation section 160 creates an ACK (Acknowledgement: positive response) signal and inputs the ACK signal to an encoding section 310. On the other hand, when CRC=NG is input, the response signal creation section 160 creates a NACK (Negative Acknowledgement: negative response) signal and inputs the NACK signal to the encoding section 310. The encoding section 310 encodes the ACK signal or NACK signal in addition to the processing of Embodiment 2 and then places the signal in a predetermined time slot. Then, the ACK signal or NACK signal for the downlink S-CCPCH is transmitted to a base station through the uplink DPCH as shown in FIG. 12. When no uplink DPCH is set, the mobile station may also transmit the ACK signal or NACK signal for the downlink S-CCPCH through an uplink PRACH (Physical Random Access Channel) instead of the uplink DPCH.

Figure 13:
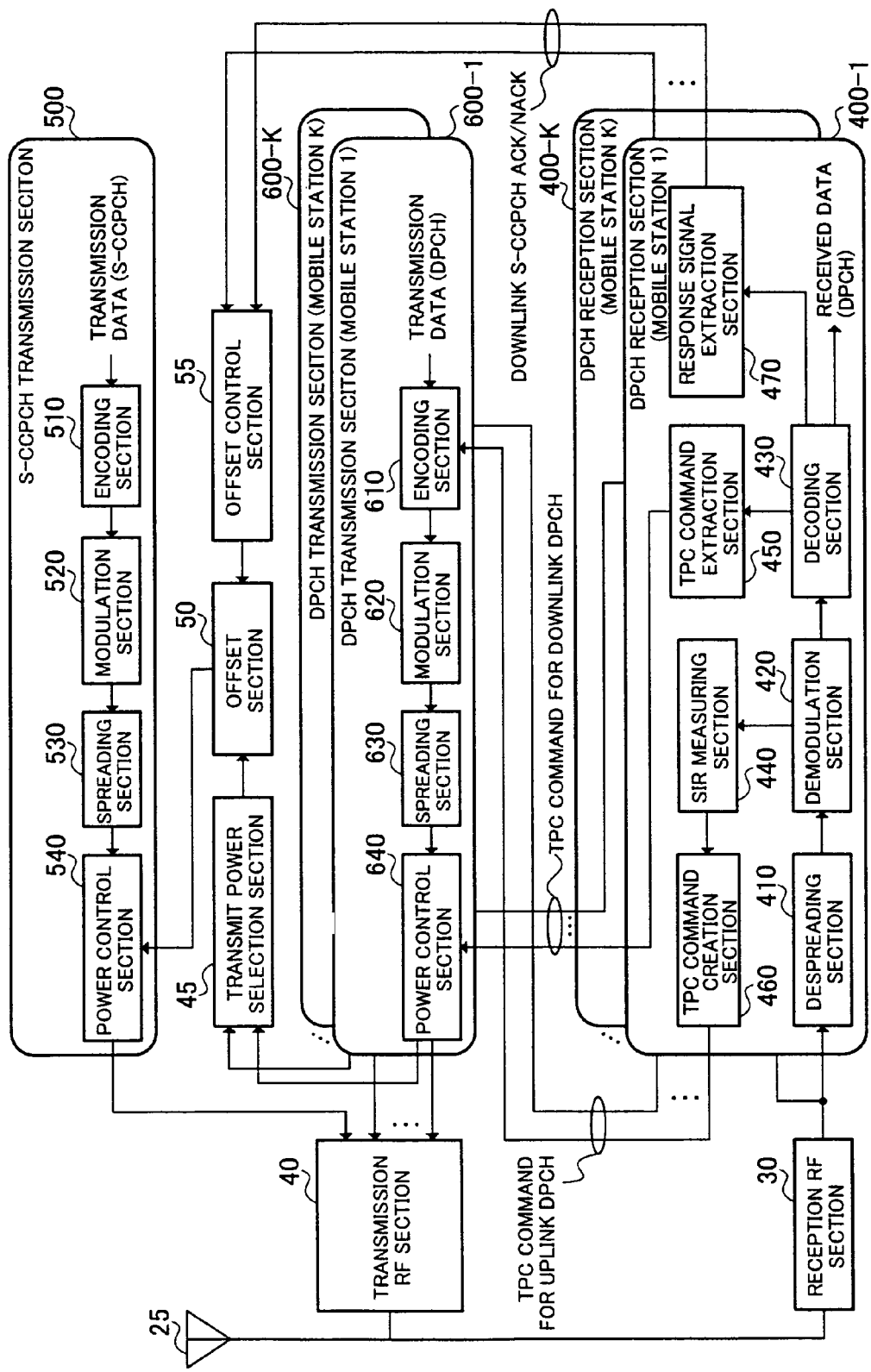
FIG. 13 is a block diagram showing a configuration of a base station according to Embodiment 3 of the present invention.

FIG. 13 is a block diagram showing a configuration of a base station according to Embodiment 3 of the present invention. The base station shown in FIG. 13 adopts a configuration with an offset control section 55 and a response signal extraction section 470 in the DPCH reception sections 400-1 to 400-K added to the base station shown in Embodiment 2 (FIG. 9). In FIG. 13, the same components as those in FIG. 9 are assigned the same reference numerals and explanations thereof will be omitted.

A decoding section 430 inputs received data of the DPCH to a TPC command extraction section 450 and the response signal extraction section 470. The response signal extraction section 470 extracts an ACK signal or NACK signal placed in a predetermined time slot of the received data of the DPCH. The extracted ACK signal or NACK signal of the downlink S-CCPCH is input to the offset control section 55. That is, the offset control section 55 receives the ACK signal or NACK signal of the downlink S-CCPCH from the respective response signal extraction sections 470 of the DPCH reception sections 400-1 to 400-K.

When a NACK signal is input a plurality of N times consecutively any of mobile station 1 to mobile station K (that is, when the base station receives a NACK signal for any mobile station a plurality of times consecutively), the offset control section 55 decides that the transmit power of the downlink S-CCPCH falls short and increases the amount of offset added by the offset section 50 by a predetermined amount (e.g., 1 dB). On the other hand, when an ACK signal is input for any of mobile stations 1 to mobile station K a plurality of M times consecutively (that is, the base station receives an ACK signal for any mobile station a plurality of times consecutively), the offset control section 55 decides that the transmit power of the downlink S-CCPCH is excessive and reduces the amount of offset added by the offset section 50 by a predetermined amount (e.g., 0.5 dB).

Thus, by controlling the amount of offset, it is furthermore possible to set an appropriate amount of offset in addition to the effect of Embodiment 2 and carry out more appropriate transmit power control on the downlink S-CCPCH.

This embodiment can also be adapted in such a way that the mobile station does not transmit any ACK signal when CRC=OK and transmits a NACK signal only when CRC=NG. In this case, the base station increases the amount of offset when a NACK signal is received and decreases the amount of offset when neither ACK signal nor NACK signal is received.

Embodiment 4

This embodiment increases transmit power of the S-CCPCH by an amount requested by a mobile station.

Figure 14:
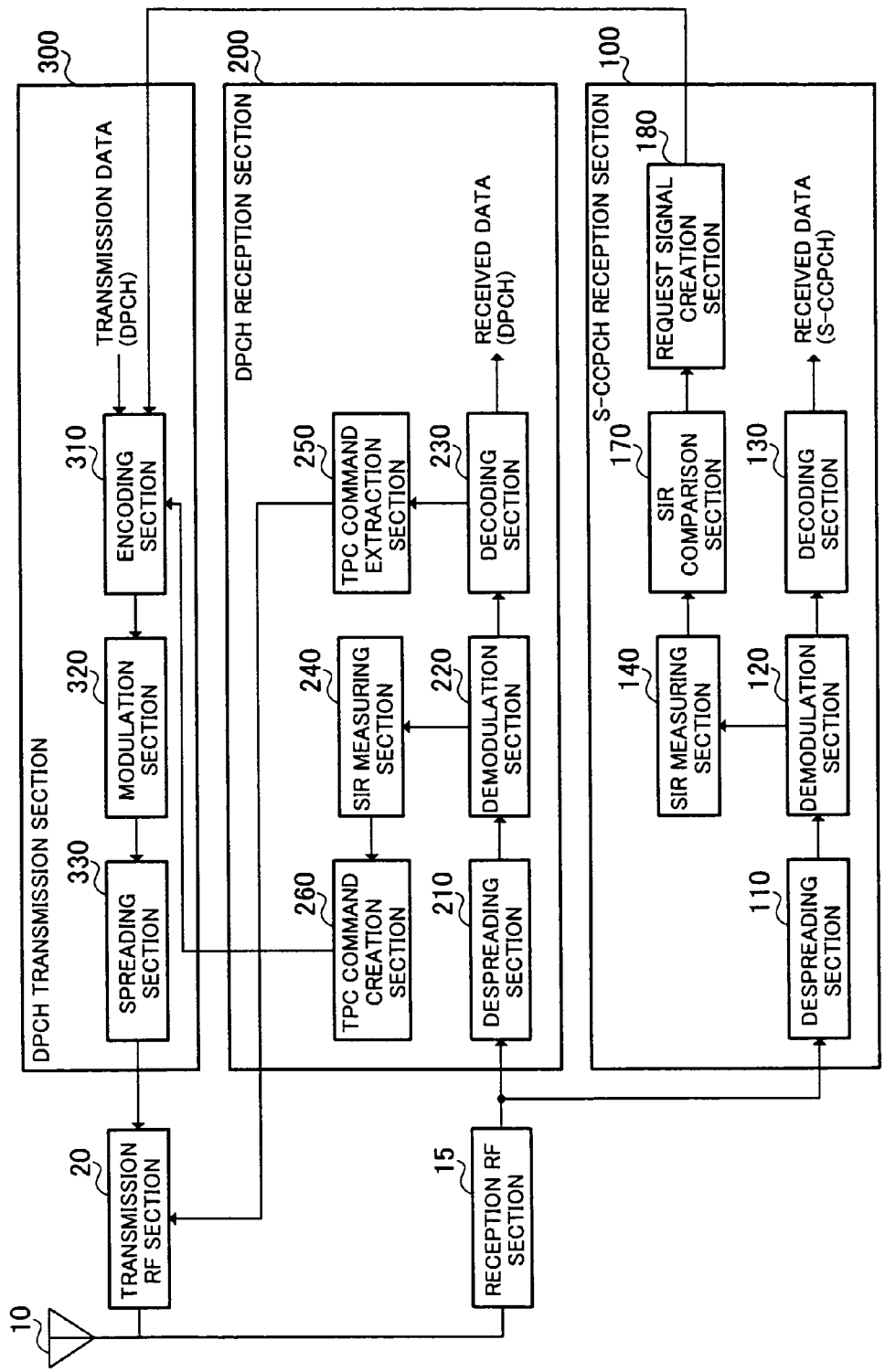
FIG. 14 is a block diagram showing a configuration of a mobile station according to Embodiment 4 of the present invention.

FIG. 14 is a block diagram showing a configuration of a mobile station according to Embodiment 4 of the present invention. The same components as those in Embodiment 1 (FIG. 2) are assigned the same reference numerals and explanations thereof will be omitted. The mobile station shown in FIG. 14 adopts a configuration with the TPC command creation section 150 omitted and an SIR comparison section 170 and a request signal creation section 180 added to the S-CCPCH reception section 100 of the mobile station shown in FIG. 2.

Figure 15:
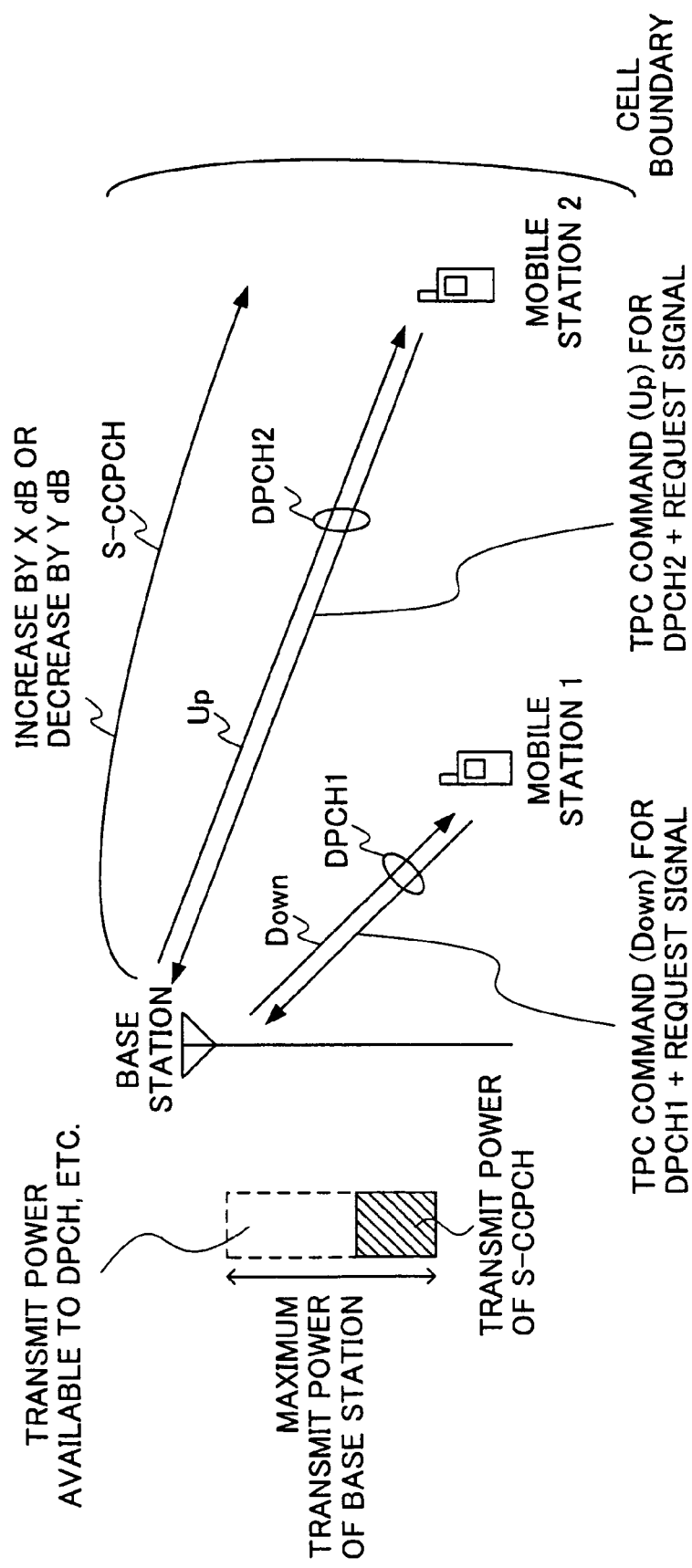
FIG. 15 illustrates transmit power control according to Embodiment 4 of the present invention.

An SIR measuring section 140 of the S-CCPCH reception section 100 measures a reception SIR of the S-CCPCH and inputs the measured SIR to the SIR comparison section 170. Suppose the input SIR is an average (average SIR) of a plurality of predetermined slots (N slots). The SIR comparison section 170 compares the input average SIR with a target SIR and inputs the difference between the target SIR and average SIR to the request signal creation section 180 only when the average SIR is less than the target SIR. The request signal creation section 180 takes this difference as an amount of increase, creates a request signal (bit string) for requesting an increase of the transmit power of the S-CCPCH and inputs it to an encoding section 310. The encoding section 310 encodes the request signal in addition to the processing of Embodiment 2 and then places the request signal in a predetermined time slot. Then, the request signal for the downlink S-CCPCH is transmitted to a base station through the uplink DPCH as shown in FIG. 15. Note that when no uplink DPCH is set, the mobile station can also transmit a request signal for the downlink S-CCPCH through an uplink PRACH instead of the uplink DPCH.

Figure 16:
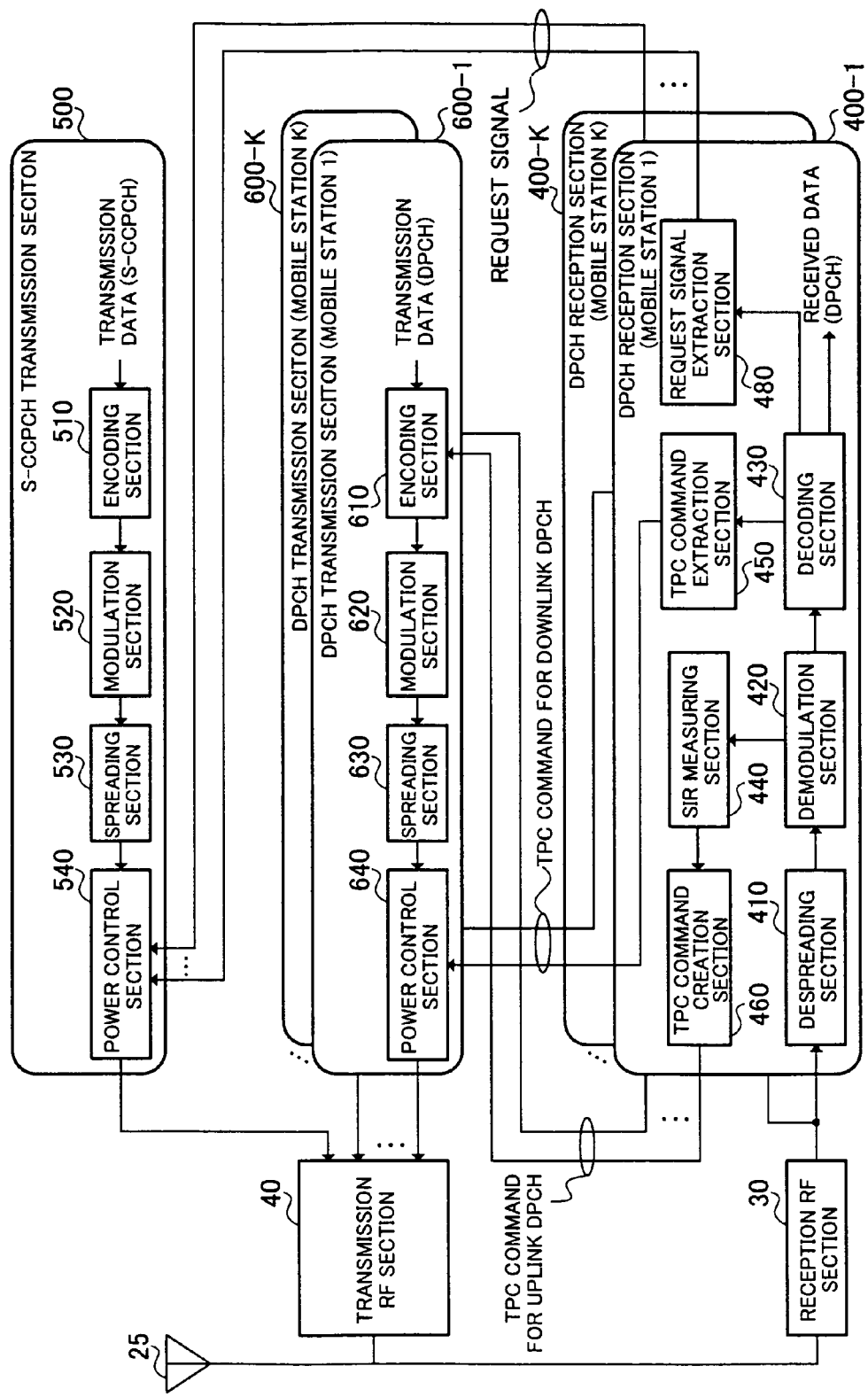
FIG. 16 is a block diagram showing a configuration of a base station according to Embodiment 4 of the present invention.

FIG. 16 is a block diagram showing a configuration of the base station according to Embodiment 4 of the present invention. The base station shown in FIG. 16 adopts a configuration with the TPC command selection section 35 omitted and a request signal extraction section 480 added to the DPCH reception sections 400-1 to 400-K compared to Embodiment 1 (FIG. 3). The same components as those in Embodiment 1 (FIG. 3) are assigned the same reference numerals and explanations thereof will be omitted.

A decoding section 430 inputs received data of the DPCH to a TPC command extraction section 450 and the request signal extraction section 480. The request signal extraction section 480 extracts a request signal placed in a predetermined time slot of the received data of the DPCH. The extracted request signal is input to a power control section 540 of an S-CCPCH transmission section 500. That is, the power control section 540 receives request signals for the downlink S-CCPCH from the respective request signal extraction sections 480 of the DPCH reception sections 400-1 to 400-K.

Figure 17:
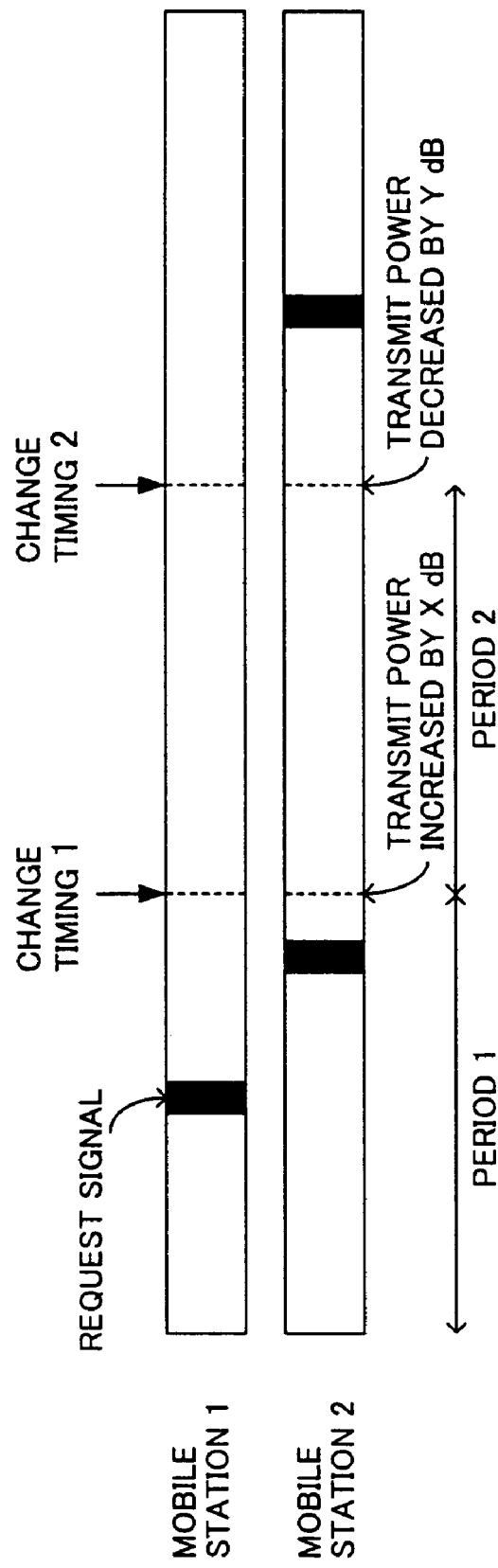
FIG. 17 illustrates a transmit power variation period according to Embodiment 4 of the present invention.

The power control section 540 changes the transmit power of the S-CCPCH in a certain period as shown in FIG. 17. When a plurality of request signals is input during one period (that is, when request signals are transmitted from a plurality of mobile stations or a plurality of request signals is transmitted from one mobile station), the transmit power of the S-CCPCH is increased by the maximum amount of increase of the amount of increase of the transmit power shown by those request signals. For example, when request signals are transmitted from the mobile station 1 and mobile station 2 in period 1 as shown in FIG. 17, the transmit power of the S-CCPCH is increased by the requested maximum amount of increase of X dB at a change timing 1. On the other hand, when no request signal is input in one period (that is, no request signal is transmitted from either of the mobile stations), the transmit power of the S-CCPCH is decreased by a predetermined amount of Y dB (e.g., Y=0.1 dB). For example, as shown in FIG. 17, when neither, mobile station 1 nor mobile station 2 transmits a request signal in period 2, the transmit power of the S-CCPCH is decreased by Y dB at a change timing 2. Thus, by controlling the transmit power of the S-CCPCH, it is possible to control the transmit power of the S-CCPCH to minimum necessary power for all the mobile stations in the cell to receive. As a result, it is possible to reduce the transmit power of the S-CCPCH compared to the conventional case.

Thus, by carrying out transmit power control over the downlink DPCH concurrently with transmit power control over the downlink S-CCPCH, it is possible to comparatively increase the transmit power available to other channels such as DPCH as compared to the conventional case (FIG. 1) as in the cases of Embodiment 1 and Embodiment 2 and thereby increase capacities of other channels such as DPCH. It is also possible to reduce interference with other cells and consequently prevent the system capacity from reducing.

As explained above, the present invention can control the transmit power of an MBMS common channel appropriately in such a way that the transmit power does not become excessive.

This application is based on Japanese Patent Application No. 2002-273164 filed on Sep. 19, 2002, entire content of which is expressly incorporated by reference herein.

INDUSTRIAL APPLICABILITY

The present invention is preferably applicable to a radio communication base station apparatus, etc., used in a mobile communication system.

FIG. 1

TRANSMIT POWER AVAILABLE TO DPCH, ETC.
BASE STATION
MAXIMUM TRANSMIT POWER OF BASE STATION
TRANSMIT POWER OF S-CCPCH
MOBILE STATION 1
MOBILE STATION 2
CELL BOUNDARY

FIG. 2

20 TRANSMISSION RF SECTION
300 DPCH TRANSMISSION SECTION
330 SPREADING SECTION
320 MODULATION SECTION
310 ENCODING SECTION
TRANSMISSION DATA (DPCH)
200 DPCH RECEPTION SECTION
260 TPC COMMAND CREATION SECTION
240 SIR MEASURING SECTION
250 TPC COMMAND EXTRACTION SECTION
15 RECEPTION RF SECTION
210 DESPREADING SECTION
220 DEMODULATION SECTION
230 DECODING SECTION
RECEIVED DATA (DPCH)
100 S-CCPCH RECEPTION SECTION
150 TPC COMMAND CREATION SECTION
140 SIR MEASURING SECTION
110 DESPREADING SECTION
120 DEMODULATION SECTION
130 DECODING SECTION
RECEIVED DATA (S-CCPCH)

FIG. 3

600-K DPCH TRANSMISSION SECITON (MOBILE STATION K)
600-1 DPCH TRANSMISSION SECITON (MOBILE STATION 1)
640 POWER CONTROL SECTION
630 SPREADING SECTION
620 MODULATION SECTION
610 ENCODING SECTION
TRANSMISSION DATA (DPCH)
40 TRANSMISSION RF SECTION
500 S-CCPCH TRANSMISSION SECITON
540 POWER CONTROL SECTION
530 SPREADING SECTION
520 MODULATION SECTION
510 ENCODING SECTION
TRANSMISSION DATA (S-CCPCH)
TPC COMMAND FOR UPLINK DPCH
TPC COMMAND FOR DOWNLINK DPCH
TPC COMMAND FOR DOWNLINK S-CCPCH
35 TPC COMMAND SELECTION SECTION
400-K DPCH RECEPTION SECTION (MOBILE STATION K)
400-1 DPCH RECEPTION SECTION (MOBILE STATION 1)
460 TPC COMMAND CREATION SECTION
440 SIR MEASURING SECTION
450 TPC COMMAND EXTRACTION SECTION
30 RECEPTION RF SECTION
410 DESPREADING SECTION
420 DEMODULATION SECTION
430 DECODING SECTION
RECEIVED DATA (DPCH)

FIG. 4

TPC COMMAND FOR DOWNLINK DPCH
TPC COMMAND FOR DOWNLINK S-CCPCH
UPLINK DPCH DATA
UPLINK DPCH
ONE FRAME

FIG. 5

TPC COMMAND FOR DOWNLINK S-CCPCH
TPC COMMAND FOR DOWNLINK DPCH
UPLINK DPCH DATA
UPLINK DPCH
ONE FRAME

FIG. 6

TPC COMMAND FOR DOWNLINK DPCH
TPC COMMAND FOR DOWNLINK S-CCPCH
UPLINK DPCH DATA
UPLINK DPCH
ONE FRAME

FIG. 7

TRANSMIT POWER AVAILABLE TO DPCH, ETC.
BASE STATION
MAXIMUM TRANSMIT POWER OF BASE STATION
TRANSMIT POWER OF S-CCPCH
MOBILE STATION 1 MOBILE STATION 2
TPC COMMAND (Down) FOR DPCH1+TPC COMMAND (Down) FOR S-CCPCH
TPC COMMAND (Up) FOR DPCH2+TPC COMMAND (Up) FOR S-CCPCH CELL BOUNDARY

FIG. 8

20 TRANSMISSION RF SECTION
300 DPCH TRANSMISSION SECTION
330 SPREADING SECTION
320 MODULATION SECTION
310 ENCODING SECTION
TRANSMISSION DATA (DPCH)
200 DPCH RECEPTION SECTION
260 TPC COMMAND CREATION SECTION
240 SIR MEASURING SECTION
250 TPC COMMAND EXTRACTION SECTION
15 RECEPTION RF SECTION
210 DESPREADING SECTION
220 DEMODULATION SECTION
230 DECODING SECTION
RECEIVED DATA (DPCH)
100 S-CCPCH RECEPTION SECTION
110 DESPREADING SECTION
120 DEMODULATION SECTION
130 DECODING SECTION
RECEIVED DATA (S-CCPCH)

FIG. 9

500 S-CCPCH TRANSMISSION SECITON
540 POWER CONTROL SECTION
530 SPREADING SECTION
520 MODULATION SECTION
510 ENCODING SECTION
TRANSMISSION DATA (S-CCPCH)
45 TRANSMIT POWER SELECTION SECTION
50 OFFSET SECTION
40 TRANSMISSION RF SECTION
600-K DPCH TRANSMISSION SECITON (MOBILE STATION K)
600-1 DPCH TRANSMISSION SECITON (MOBILE STATION 1)
640 POWER CONTROL SECTION
630 SPREADING SECTION
620 MODULATION SECTION
610 ENCODING SECTION
TRANSMISSION DATA (DPCH)
TPC COMMAND FOR UPLINK DPCH
TPC COMMAND FOR DOWNLINK DPCH
400-K DPCH RECEPTION SECTION (MOBILE STATION K)
400-1 DPCH RECEPTION SECTION (MOBILE STATION 1)
460 TPC COMMAND CREATION SECTION
440 SIR MEASURING SECTION
450 TPC COMMAND EXTRACTION SECTION
30 RECEPTION RF SECTION
410 DESPREADING SECTION
420 DEMODULATION SECTION
430 DECODING SECTION
RECEIVED DATA (DPCH)

FIG. 10

TRANSMIT POWER AVAILABLE TO DPCH, ETC.
BASE STATION
TRANSMIT POWER OF DOWNLINK DPCH2+OFFSET
MAXIMUM TRANSMIT POWER OF BASE STATION
TRANSMIT POWER OF S-CCPCH
MOBILE STATION 1 MOBILE STATION 2
TPC COMMAND (Down) FOR DPCH1
TPC COMMAND (Up) FOR DPCH2
CELL BOUNDARY

FIG. 11

20 TRANSMISSION RF SECTION
300 DPCH TRANSMISSION SECTION
330 SPREADING SECTION
320 MODULATION SECTION
310 ENCODING SECTION
TRANSMISSION DATA (DPCH)
200 DPCH RECEPTION SECTION
260 TPC COMMAND CREATION SECTION
240 SIR MEASURING SECTION
250 TPC COMMAND EXTRACTION SECTION
15 RECEPTION RF SECTION
210 DESPREADING SECTION
220 DEMODULATION SECTION
230 DECODING SECTION
RECEIVED DATA (DPCH)
100 S-CCPCH RECEPTION SECTION
160 RESPONSE SIGNAL CREATION SECTION
110 DESPREADING SECTION
120 DEMODULATION SECTION
130 DECODING SECTION
RECEIVED DATA (S-CCPCH)

FIG. 12

TRANSMIT POWER AVAILABLE TO DPCH, ETC.
BASE STATION
TRANSMIT POWER OF DOWNLINK DPCH2+OFFSET
MAXIMUM TRANSMIT POWER OF BASE STATION
TRANSMIT POWER OF S-CCPCH
MOBILE STATION 1 MOBILE STATION 2
TPC COMMAND (Down) FOR DPCH1+ACK/NACK
TPC COMMAND (Up) FOR DPCH2+ACK/NACK
CELL BOUNDARY

FIG. 13

500 S-CCPCH TRANSMISSION SECITON
540 POWER CONTROL SECTION
530 SPREADING SECTION
520 MODULATION SECTION
510 ENCODING SECTION
TRANSMISSION DATA (S-CCPCH)
45 TRANSMIT POWER SELECTION SECTION
50 OFFSET SECTION
55 OFFSET CONTROL SECTION
40 TRANSMISSION RF SECTION
600-K DPCH TRANSMISSION SECITON (MOBILE STATION K)
600-1 DPCH TRANSMISSION SECITON (MOBILE STATION 1)
640 POWER CONTROL SECTION
630 SPREADING SECTION
620 MODULATION SECTION
610 ENCODING SECTION
TRANSMISSION DATA (DPCH)
TPC COMMAND FOR UPLINK DPCH
TPC COMMAND FOR DOWNLINK DPCH
DOWNLINK S-CCPCH ACK/NACK
400-K DPCH RECEPTION SECTION (MOBILE STATION K)
400-1 DPCH RECEPTION SECTION (MOBILE STATION 1)
460 TPC COMMAND CREATION SECTION
440 SIR MEASURING SECTION
450 TPC COMMAND EXTRACTION SECTION
470 RESPONSE SIGNAL EXTRACTION SECTION
30 RECEPTION RF SECTION
410 DESPREADING SECTION
420 DEMODULATION SECTION
430 DECODING SECTION
RECEIVED DATA (DPCH)

FIG. 14

20 TRANSMISSION RF SECTION
300 DPCH TRANSMISSION SECTION
330 SPREADING SECTION
320 MODULATION SECTION
310 ENCODING SECTION
TRANSMISSION DATA (DPCH)
200 DPCH RECEPTION SECTION
260 TPC COMMAND CREATION SECTION
240 SIR MEASURING SECTION
250 TPC COMMAND EXTRACTION SECTION
15 RECEPTION RF SECTION

210 DESPREADING SECTION
220 DEMODULATION SECTION
230 DECODING SECTION
RECEIVED DATA (DPCH)
100 S-CCPCH RECEPTION SECTION
140 SIR MEASURING SECTION
170 SIR COMPARISON SECTION
180 REQUEST SIGNAL CREATION SECTION
110 DESPREADING SECTION
120 DEMODULATION SECTION
130 DECODING SECTION
RECEIVED DATA (S-CCPCH)

FIG. 15

TRANSMIT POWER AVAILABLE TO DPCH, ETC.
BASE STATION
INCREASE BY X dB OR DECREASE BY Y dB
MAXIMUM TRANSMIT POWER OF BASE STATION
TRANSMIT POWER OF S-CCPCH
MOBILE STATION 1 MOBILE STATION 2
TPC COMMAND (Down) FOR DPCH1+REQUEST SIGNAL
TPC COMMAND (Up) FOR DPCH2+REQUEST SIGNAL
CELL BOUNDARY

FIG. 16

500 S-CCPCH TRANSMISSION SECITON
540 POWER CONTROL SECTION
530 SPREADING SECTION
520 MODULATION SECTION
510 ENCODING SECTION
TRANSMISSION DATA (S-CCPCH)
40 TRANSMISSION RF SECTION
600-K DPCH TRANSMISSION SECITON (MOBILE STATION K)
600-1 DPCH TRANSMISSION SECITON (MOBILE STATION 1)
640 POWER CONTROL SECTION
630 SPREADING SECTION
620 MODULATION SECTION
610 ENCODING SECTION
TRANSMISSION DATA (DPCH)
TPC COMMAND FOR UPLINK DPCH
TPC COMMAND FOR DOWNLINK DPCH
REQUEST SIGNAL
400-K DPCH RECEPTION SECTION (MOBILE STATION K)
400-1 DPCH RECEPTION SECTION (MOBILE STATION 1)
460 TPC COMMAND CREATION SECTION
440 SIR MEASURING SECTION
450 TPC COMMAND EXTRACTION SECTION
480 REQUEST SIGNAL EXTRACTION SECTION
30 RECEPTION RF SECTION
410 DESPREADING SECTION
420 DEMODULATION SECTION
430 DECODING SECTION
RECEIVED DATA (DPCH)

FIG. 17

REQUEST SIGNAL
CHANGE TIMING 1
CHANGE TIMING 2
MOBILE STATION 1
MOBILE STATION 2
TRANSMIT POWER INCREASED BY X dB
TRANSMIT POWER DECREASED BY Y dB
PERIOD 1
PERIOD 2

What is claimed is:

1. A method for controlling transmit power carrying out a transmit power control over a downlink common channel used to simultaneously transmit same data to a plurality of mobile stations concurrently with a transmit power control over downlink dedicated channels assigned individually to said plurality of mobile stations, comprising the steps of:
 each of said plurality of mobile stations each transmitting a first TPC command for the downlink common channel and a second TPC command for the downlink dedicated channel to a base station through an uplink dedicated channel; and
 said base station controlling transmit power of the downlink common channel based on said first TPC commands and controlling transmit powers of the downlink dedicated channels based on said second TPC commands, wherein:
 for each mobile station a transmission interval of said first TPC command is longer than a transmission interval of said second TPC command.

2. A method for controlling transmit power carrying out a transmit power control over a downlink common channel used to simultaneously transmit same data to a plurality of mobile stations concurrently with a transmit power control over downlink dedicated channels assigned individually to said plurality of mobile stations, comprising the steps of:
 each of said plurality of mobile stations each transmitting a first TPC command for the downlink common channel and a second TPC command for the downlink dedicated channel to a base station through an uplink dedicated channel; and
 said base station controlling transmit power of the downlink common channel based on said first TPC commands and controlling transmit powers of the downlink dedicated channels based on said second TPC commands, wherein:
 in one frame, the number of times said first TPC command is transmitted is smaller than the number of times said second TPC command is transmitted for each mobile station.

3. A method for controlling transmit cower carrying out a transmit power control over a downlink common channel used to simultaneously transmit same data to a plurality of mobile stations concurrently with a transmit power control over downlink dedicated channels assigned individually to said plurality of mobile stations, comprising the steps of:
 each of said plurality of mobile stations each transmitting a first TPC command for the downlink common channel and a second TPC command for the downlink dedicated channel to a base station through an uplink dedicated channel; and
 said base station controlling transmit power of the downlink common channel based on said first TPC commands and controlling transmit powers of the downlink dedicated channels based on said second TPC commands, wherein:
 both said first TPC command and said second TPC command are transmitted in a same time slot for each mobile station.

4. A method for controlling transmit power carrying out a transmit power control over a downlink common channel used to simultaneously transmit same data to a plurality of mobile stations concurrently with a transmit power control over downlink dedicated channels assigned individually to said plurality of mobile stations, comprising the steps of:

each of said plurality of mobile stations each transmitting a first TPC command for the downlink common channel and a second TPC command for the downlink dedicated channel to a base station through an uplink dedicated channel; and said base station controlling transmit power of the downlink common channel based on said first TPC commands and controlling transmit powers of the downlink dedicated channels based on said second TPC commands, wherein:

said base station increases a transmit power of the downlink common channel when at least one of the first TPC commands transmitted from said plurality of mobile stations is a TPC command instructing an increase of the transmit power and decreases the transmit power of the downlink common channel when all of said first TPC commands transmitted from said plurality of mobile stations are TPC commands instructing a decrease of the transmit power.

5. A method for controlling transmit power carrying out a transmit power control over a downlink common channel used to simultaneously transmit same data to a plurality of mobile stations concurrently with a transmit power control over downlink dedicated channels assigned individually to said plurality of mobile stations, comprising the steps of:

each of said plurality of mobile stations each transmitting a TPC command for the downlink dedicated channels to a base station through an uplink dedicated channel; and said base station controlling transmit powers of the downlink dedicated channels based on said TPC commands and controlling a transmit power of the downlink common channel at a transmit power signal to a maximum transmit power in a plurality of transmission powers of the downlink dedicated channels after transmit power control or at said maximum transmit power with an addition of an offset.

6. The method for controlling transmit power according to claim 5, wherein each of said plurality of mobile stations each transmit an ACK signal or a NACK signal for the downlink canon channel to said base station through the uplink dedicated channel or an uplink random access channel, and said base station decreases said offset when the ACK signal is received a plurality of times consecutively and increases said offset when the NACK signal is received a plurality of times consecutively.

7. A method for controlling transmit power carrying out transmit power control over a downlink common channel used to simultaneously transmit same data to a plurality of mobile stations concurrently with a transmit power control over downlink dedicated channels assigned individually to said plurality of mobile stations, comprising the steps of:

each of said plurality of mobile stations each transmitting a TPC command for a downlink dedicated channel and a signal indicating an amount of increase of a transmit power of the downlink common channel to a base station through an uplink dedicated channel or an uplink random access channel; and said base station controlling transmit powers of the downlink dedicated channels based on said TPC commands and increasing a transmit power of the downlink common channel by said amount of increase of the transmit power.

8. A base station apparatus carrying out a transmit power control over a downlink common channel used to simultaneously transmit sane data to a plurality of mobile stations concurrently with a transmit power control over downlink dedicated channels assigned individually to said plurality of mobile stations, comprising:

a reception section that receives a first TPC command for the downlink common channel and a second TPC command for the downlink dedicated channel through an uplink dedicated channel from each of said plurality of mobile stations;

a first control section that controls a transmit power of the downlink common channel based on said first TPC commands; and a second control section that controls transmit powers of the downlink dedicated channels based on said second TPC commands, wherein:

said first control section increases the transmit power of the downlink common channel when at least one of the first TPC commands transmitted from said plurality of mobile stations is a TPC command instructing an increase of the transmit power and decreases the transmit power of the downlink common channel when all of said first TPC commands transmitted from said plurality of mobile stations are TPC commands instructing a decrease of the transmit power.

9. A base station apparatus carrying out a transmit power control over a downlink common channel used to simultaneously transmit the same data to a plurality of mobile stations concurrently with a transmit power control over downlink dedicated channels assigned individually to said plurality of mobile stations, comprising:

a reception section that receives a TPC command for the downlink dedicated channel through an uplink dedicated channel from each of said plurality of mobile stations;

a first control section that controls transmit powers of the downlink dedicated channels based on said TPC commands; and a second control section that controls a transmit power of the downlink common channel at a transmit power equal to a maximum transmit power in a plurality of transmit powers of the downlink dedicated channels after transmit power control or at said maximum transmit power with an addition of an offset.

10. A base station apparatus carrying out a transmit power control over a downlink common channel used to simultaneously transmit same data to a plurality of mobile stations concurrently with a transmit power control over downlink dedicated channels assigned individually to said plurality of mobile stations, comprising:

a reception section that receives a TPC command for a downlink dedicated channel and a signal indicating an amount of increase of a transmit power of a downlink common channel through an uplink dedicated channel from each of said plurality of mobile stations;

a first control section that controls transmit powers of the downlink dedicated channels based an said TPC commands; and a second control section that increases the transmit power of the downlink common channel by said amount of increase of the transmit power.

* * * * *